United States Patent
Oosaku et al.

(10) Patent No.: US 9,026,014 B2
(45) Date of Patent: May 5, 2015

(54) DEVELOPING ROLLER

(75) Inventors: Akihide Oosaku, Yokohama (JP); Shogo Imai, Yokohama (JP); Yusuke Fujisawa, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/979,678

(22) PCT Filed: Feb. 1, 2012

(86) PCT No.: PCT/JP2012/052298
§ 371 (c)(1),
(2), (4) Date: Jul. 15, 2013

(87) PCT Pub. No.: WO2012/105615
PCT Pub. Date: Aug. 9, 2012

(65) Prior Publication Data
US 2013/0302070 A1 Nov. 14, 2013

(30) Foreign Application Priority Data

Feb. 1, 2011 (JP) .................. 2011-019925
Feb. 1, 2011 (JP) .................. 2011-019926
Feb. 1, 2011 (JP) .................. 2011-019927

(51) Int. Cl.
*F16C 13/00* (2006.01)
*C09D 175/16* (2006.01)
*G03G 15/08* (2006.01)

(52) U.S. Cl.
CPC ............ *G03G 15/0818* (2013.01); *F16C 13/00* (2013.01); *F16C 2208/80* (2013.01); *G03G 15/0808* (2013.01)

(58) Field of Classification Search
USPC .................... 399/280, 286; 428/423.1, 425.9; 528/65, 75, 85
See application file for complete search history.

(56) References Cited

U.S. PATENT DOCUMENTS

| | | | |
|---|---|---|---|
| 2007/0111874 A1 | 5/2007 | Sugimura et al. | |
| 2007/0177909 A1* | 8/2007 | Takagi et al. | ............ 399/286 |
| 2007/0197362 A1 | 8/2007 | Sakata et al. | |
| 2008/0081277 A1 | 4/2008 | Nakamura et al. | |
| 2008/0304874 A1 | 12/2008 | Takagi et al. | |
| 2008/0318748 A1 | 12/2008 | Akama et al. | |

FOREIGN PATENT DOCUMENTS

| | | |
|---|---|---|
| JP | 11-052672 A | 2/1999 |
| JP | 2000-206779 A | 7/2000 |
| JP | 2002-055520 A | 2/2002 |
| JP | 2004-240389 A | 8/2004 |
| JP | 2006-301512 A | 11/2006 |
| JP | 2006-337673 A | 12/2006 |
| JP | 2007-131770 A | 5/2007 |
| JP | 2007-133223 A | 5/2007 |

(Continued)

*Primary Examiner* — Thao T. Tran
(74) *Attorney, Agent, or Firm* — Sughrue Mion, PLLC

(57) ABSTRACT

Provided is a developing roller in which printing quality, in particular, one-dot level fine line printing quality is improved by securing a high resistance value and high surface potential on the surface layer. The elastic roller comprises successively on the outer periphery of a shaft 1 an elastic layer 2, an intermediate layer 3, and a surface layer 4. The surface layer 4 contains a urethane (meth)acrylate oligomer obtained by allowing polybutadiene polyol or hydrogenated polybutadiene polyol, polyisocyanate, and (meth)acrylate having a hydroxyl group to react.

10 Claims, 1 Drawing Sheet

(56) References Cited

FOREIGN PATENT DOCUMENTS

| | | |
|---|---|---|
| JP | 2007-233367 A | 9/2007 |
| JP | 2008-107789 A | 5/2008 |
| JP | 2008-165214 A | 7/2008 |
| JP | 2008-233157 A | 10/2008 |
| JP | 2009-063724 A | 3/2009 |
| JP | 2009-115952 A | 5/2009 |
| JP | 2009-244461 A | 10/2009 |
| WO | 2005/121906 A1 | 12/2005 |
| WO | 2006/109563 A1 | 10/2006 |

* cited by examiner

DEVELOPING ROLLER

TECHNICAL FIELD

The present invention relates to a developing roller (hereinafter, also simply referred to as "roller"), and more specifically to a developing roller which is used in an image forming process in an image forming apparatus such as a copying machine or a printer.

BACKGROUND ART

Conventionally, as a development method in which a nonmagnetic one component developer is used as a developer (toner), known is a development method (impression development) in which a toner is provided via a developing roller on an image holding body such as a photoconductor drum on which an electrostatic latent image is held, and the toner is attached to the latent image on the image holding body, thereby visualizing the latent image. Since, in this development method, development is performed by adhering a toner on the latent image on the image holding body by contacting the developing roller on which a toner is held on an image holding body which holds an electrostatic latent image, the developing roller used for the development method needs to be formed of an elastic body having electrical conductivity.

FIG. 2 illustrates one example of the structure of a development apparatus using impression development. In the illustrated development apparatus, a developing roller 10 is arranged between a toner supplying roller 11 which supplies toner and a photoconductor drum 12 which holds an electrostatic latent image in a state in which the developing roller 10 is in contact with the photoconductor drum 12. Each of these rollers, the developing roller 10, the photoconductor drum 12 and the toner supplying roller 11 rotates in the arrow direction in the figure, and toner 13 is supplied on the surface of the developing roller 10 by the toner supplying roller 11. The supplied toner is adjusted in an uniform thin layer by a layer forming blade 14. The developing roller 10 in this state rotates while being in contact with the photoconductor drum 12, and thus the toner formed in a thin layer adheres to the latent image on the photoconductor drum 12 from the developing roller 10, whereby the latent image is visualized. Reference numeral 15 in the figure indicates a transfer unit, where a toner image is transferred to recording media such as a paper. Reference numeral 16 indicates a cleaning unit, by which toner remaining on the surface of the photoconductor drum 12 after the image is transferred is removed by a cleaning blade 17.

As an improvement technique relating to an electrically conductive roller, for example, Patent Document 1 discloses an electrically conductive roller for an electrophotographic device in which an electrically conductive elastic layer is composed of a polyurethane obtained by using a polyol whose hydrophobicity is larger than that of polypropylene ether glycol. Patent document 2 discloses a developing roller for an electrophotographic device in which a polyurethane elastic body formed by using a mixed polyol obtained by mixing a polypropylene polyol and a hydrophobic polyol and a polyisocyanate is arranged around a cored bar. Further, Patent Document 3 discloses a roll member for an electrophotographic machine which uses foamable polymer composition containing as essential components (A) a polymer whose main chain is composed of a structural unit derived from a saturated hydrocarbon polymer and which has at least two hydroxyl groups, (B) a hydrosilylated compound and (C) a catalyst.

By the way, when a white solid image is printed under high-temperature and high-humidity environment, at a temperature of about 32.5° C. and at a humidity of about 80% RH, the above-mentioned apparatus using the development method sometimes causes so-called fogging in which toner held on the surface of a developing roller adheres to a portion which is to be white background on an image holding body and the toner is transferred to a white background portion on a printed image. One of the causes of such occurrence of fogging under high-temperature and high-humidity environment is insufficiently charged toner. This is because, under high-temperature and high-humidity environment, there is small static electricity and electrostatic adhesion of the toner to the developing roller becomes weak. For this reason, studies have conventionally been made in order to improve the toner electrification amount as a measure to prevent fogging under high-temperature and high-humidity environment.

On the other hand, to provide a developing roller on the surface of which the occurrence of filming is suppressed, and which forms a high-quality toner image having high density and free from fogging, and does not cause soiling in a device, for example, Patent Document 4 discloses a technique in which, in a developing roller in which a coating layer having conductivity is formed on the outer periphery of an electrically conductive shaft, when a resin thin film composed of only resin which forms the coating layer is electrified by an electrifier, letting the surface potential of the resin thin film one second thereafter be Rv1 and the surface potential of the resin thin film ten seconds thereafter be Rv2, the developing roller satisfies the relation: $0.01 \leq Rv2/Rv1 \leq 0.20$.

It is known that, in the case that the developing roller has a constitution composed of three layers, an elastic layer, an intermediate layer and a surface layer each successively formed on the outer periphery of a shaft, by designing the resistance of the intermediate layer to be low, change in resistance value due to environmental variation can be made small, thereby improving the printing quality. For this reason, carbon black is generally added to the intermediate layer in order to reduce the resistance value of the intermediate layer. On the other hand, as a resin component constituting the intermediate layer, a thermosetting resin or a thermoplastic resin has been conventionally used. The thermosetting resin, for example, needs a large amount of heat and much time for curing, which has not been satisfactory in view of environmental friendliness or production efficiency.

On the other hand, for example, Patent Document 5 discloses an electrically conductive roller in which at least one layer of one or more elastic layers arranged in the radial direction outside of a shaft member is constituted by an ultraviolet curable resin containing a conductive agent and an ultraviolet polymerization initiator. In Patent Document 5, in an Example in which carbon black is used as a conductive agent of the elastic layer, the elastic layer is cured by irradiation of not a UV light but an electron beam (EB). Patent Document 6 discloses a developing roller comprising a shaft, a non-foam elastic layer formed on the outer periphery of the shaft and at least one layer of resin coating layers formed on the outer periphery of the non-foam elastic layer, the resin coating layer being composed of an ultraviolet curable resin containing a conductive agent.

RELATED ART DOCUMENTS

Patent Documents

Patent Document 1: Japanese Unexamined Patent Application Publication No. H11-52672 (claims and the like)

Patent Document 2: Japanese Unexamined Patent Application Publication No. 2006-301512 (claims and the like)
Patent Document 3: Japanese Unexamined Patent Application Publication No. 2002-55520 (claims and the like)
Patent Document 4: Japanese Unexamined Patent Application Publication No. 2008-233157 (claims and the like)
Patent Document 5: Domestic re-publication of PCT international application No. 2006-109563 (claims and the like)
Patent Document 6: Japanese Unexamined Patent Application Publication No. 2004-240389 (claims and the like)

SUMMARY OF THE INVENTION

Problems to be Solved by the Invention

Among layers constituting the surface of a developing roller, the surface layer is demanded to have a high resistance and high insulation properties in order to maintain the electrification properties of toner and secure good printing quality. In particular, in order to improve the printing quality in one-dot level fine line printing, it is important that the surface potential of the developing roller is high. Conventionally, from this point of view, a variety of improvements of the surface layer of a developing roller have been made, which are unsatisfactory, and therefore a further improvement technique has been sought to be established.

In recent years, with the advancement of technical improvement of toner, toner with high electrification is being employed for an image forming apparatus. However, when a developing roller is designed to accelerate electrification for such toner with high electrification, the image quality deteriorates under low-temperature and low-humidity environment, which is problematic. Hence, a technique has been sought to be established in which an image under low-temperature and low-humidity environment does not deteriorate and the occurence of fogging under high-temperature and high-humidity environment is inhibited.

Further, as in a technique disclosed in the above-mentioned Patent Document 5, when an ultraviolet (UV) curable resin is used as a resin constituting an intermediate layer, the layer can be cured by light irradiation for a short time, about several seconds during forming the layer; therefore, the layer has better energy efficiency or productivity compared to the case where a thermosetting resin is used. However, when a UV curable resin is used for the intermediate layer and further, carbon black is added to the intermediate layer in order to obtain low resistance, a UV light with which the resin is irradiated when the resin is to be cured is absorbed by the carbon black and thus the UV light can not reach inside the layer, resulting in occurrence of poor curing of the intermediate layer, which is problematic. On the other hand, for example, Patent Document 6 discloses an Example in which a layer containing a UV curable resin and carbon black is cured by UV light. Also in this Example, carbon black is not added in an amount sufficient for exhibiting the electrical conductivity.

Although a countermeasure for the occurrence of poor curing of the intermediate layer is possibly taken by increasing the amount of a photopolymerization initiator, since the photopolymerization initiator absorbs a UV light to proceed a curing reaction, the increased amount of photopolymerization initiator, on the contrary, prevents the UV light to reach inside the layer. Conventionally, there is thus no means for surely preventing the occurence of poor curing of a layer in which carbon black is added to a UV curable resin. For this reason, there is a limit for the obtained resistance value although, conventionally, ionic conductive agent is added to a UV curable resin to attain low resistance.

Accordingly, an object of the present invention is to resolve the above-mentioned problems and to provide a developing roller in which printing quality, in particular, one-dot level fine line printing quality is improved by securing a high resistance value and high surface potential on the surface layer.

Another object of the present invention is to resolve the above-mentioned problems and to provide a developing roller in which the occurence of fogging under high-temperature and high-humidity environment is inhibited without deteriorating an image under low-temperature and low-humidity environment.

Further, still another object of the present invention is to resolve the above-mentioned problems and to provide a developing roller in which sufficiently low resistance value of an intermediate layer is achieved without causing a problem such as coating film peeling resulting from poor curing of an intermediate layer containing a UV curable resin and carbon black and printing quality is improved by reducing change in resistance value of the roller due to environmental variation.

Means for Solving the Problems

The present inventors intensively studied polyurethane acrylate used for ultraviolet curable polyurethane resin as a surface layer material to find that polybutadiene-based urethane acrylate exhibits very high insulation properties compared to a polyester-based, polyether-based, or polycarbonate-based material. Although, as disclosed in the above-mentioned Patent Document, thermosetting polybutadiene-based polyol is conventionally studied as a material for an electrically conductive roller, there is no verified data for the use of ultraviolet curable polybutadiene-based polyol. From this point of view, the present inventors further studied to find that the above-mentioned problems can be solved by employing the constitution below, thereby completing the present invention.

More specifically, the present invention is an elastic roller comprising successively on the outer periphery of a shaft an elastic layer, an intermediate layer, and a surface layer wherein
said surface layer contains a urethane (meth)acrylate oligomer obtained by allowing polybutadiene polyol or hydrogenated polybutadiene polyol, polyisocyanate, and (meth)acrylate having a hydroxyl group to react.

In the developing roller of the present invention, said elastic layer preferably contains an ultraviolet curable resin and an ionic conductive agent. The resistance value under conditions at a temperature of 10° C. and at a humidity of 15% RH is preferably $10^4$ to $10^8 \Omega$. Further, in the roller of the present invention, said intermediate layer preferably contains 1 part by mass or more of carbon black with respect to 100 parts by mass of an ultraviolet curable resin, and further contains photopolymerization initiator having an absorption coefficient at 254 nm of $2 \times 10^4$ ml/g·cm or higher and a photopolymerization initiator having an absorption coefficient at 365 nm of $4 \times 10^2$ ml/g·cm or higher.

The present inventors intensively studied to find that the above-mentioned problems can be solved by employing not a conventional method for improving electrification of toner but a design for maintaining the electrification properties of the developing roller, in other words, by slowing potential decay on the surface of a developing roller to maintain the surface potential of the roller high for a certain period of time after electrification, thereby completing the present invention.

More specifically, the present invention is an elastic roller comprising on the outer periphery of a shaft at least an elastic layer, wherein said elastic layer contains an ultraviolet curable resin and an ionic conductive agent, and when the surface thereof is electrified by corona discharge at 8 kV from a position 1 mm away from the surface under conditions at a temperature of 32.5° C. and at a humidity of 80% RH, the surface potential 0.4 seconds thereafter is 25 V or higher.

In the developing roller of the present invention, the resistance value under conditions at a temperature of 10° C. and at a humidity of 15% RH is preferably $10^4$ to $10^8 \Omega$. In the roller of the present invention, an intermediate layer and a surface layer are preferably laminated on said elastic layer, wherein the surface layer contains a urethane (meth)acrylate oligomer obtained by allowing polybutadiene polyol or hydrogenated polybutadiene polyol, polyisocyanate, and (meth)acrylate having a hydroxyl group to react.

Further, in the roller of the present invention, an intermediate layer and a surface layer are preferably laminated on said elastic layer, wherein the intermediate layer contains 1 part by mass or more of carbon black with respect to 100 parts by mass of ultraviolet curable resin, and further contains a photopolymerization initiator having a high absorption coefficient at 254 nm of $2 \times 10^4$ ml/g·cm or higher and a photopolymerization initiator having an absorption coefficient at 365 nm of $4 \times 10^2$ ml/g·cm or higher.

Further, the present inventors intensively studied to find the following. Specifically, in a different kind of photopolymerization initiator used when a UV curable resin is cured, light which is absorbed has a different wavelength. For this reason, in order to efficiently absorb a light having a specific wavelength emitted from a light source to cure a resin, it is effective to use in combination a plurality of photopolymerization initiators in each of which a light absorbed by the photopolymerization initiator has a different wavelength.

From this point of view, the present inventors further studied to find that the above-mentioned problems can be solved by using a combination of specific plural kind of photopolymerization initiators added to an intermediate layer together with a UV curable resin and carbon black, thereby completing the present invention.

More specifically, the present invention is an elastic roller comprising successively on the outer periphery of a shaft an elastic layer, an intermediate layer and a surface layer, wherein said intermediate layer contains 1 part by mass or more of carbon black with respect to 100 parts by mass of ultraviolet curable resin, and further contains a photopolymerization initiator having an absorption coefficient at 254 nm of $2 \times 10^4$ ml/g·cm or higher and a photopolymerization initiator having an absorption coefficient at 365 nm of $4 \times 10^2$ ml/g·cm or higher.

In developing roller of the present invention, said elastic layer preferably contains an ultraviolet curable resin and an ionic conductive agent. In the roller of the present invention, the resistance value under conditions at a temperature of 10° C. and at a humidity of 15% RH is preferably $10^4$ to $10^8 \Omega$. Further, in roller of the present invention, said surface layer preferably contains a urethane (meth)acrylate oligomer obtained by allowing polybutadiene polyol or hydrogenated polybutadiene polyol, polyisocyanate, and (meth)acrylate having a hydroxyl group to react.

Effects of the Invention

In the present invention, by employing the above-mentioned constitution to secure a high resistance value and a high surface potential on the surface layer, a developing roller in which printing quality, in particular, one-dot level fine line printing quality is improved can be achieved.

In the present invention, by employing the above-mentioned constitution, a developing roller in which the occurence of fogging under high-temperature and high-humidity environment is inhibited without deteriorating an image under low-temperature and low-humidity environment can be achieved.

Further, by the present invention, by employing the above-mentioned constitution, a developing roller in which sufficiently low resistance value of an intermediate layer is achieved without causing a problem such as coating film peeling resulting from poor curing of an intermediate layer and printing quality is improved by reducing change in resistance value of the roller due to environmental variation can be achieved.

MODE FOR CARRYING OUT THE INVENTION

Embodiments of the present invention will now be described in detail with reference to the Drawings.

First Embodiment

The first embodiment of the present invention will now be described.

Figure 1:
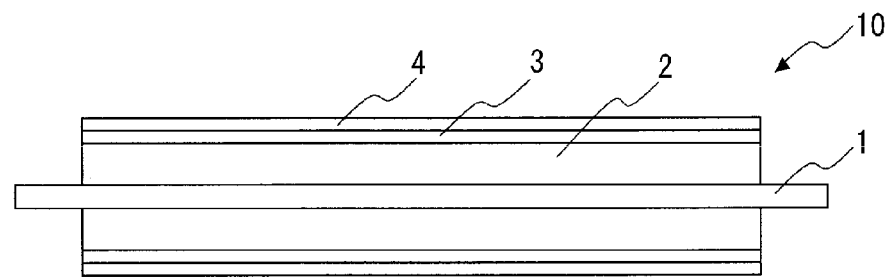
FIG. 1 is a longitudinal sectional view relating to one example of the developing roller of the present invention.
Figure 2:
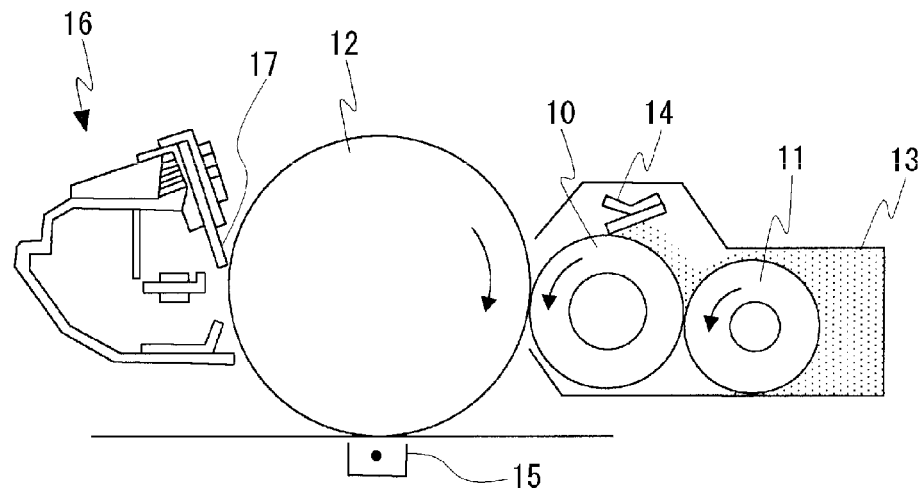
FIG. 2 is a schematic diagram illustrating one example of the constitution of a development apparatus using an impression development.

FIG. 1 illustrates a longitudinal sectional view relating to one example of the developing roller of the present invention. As illustrated, in a developing roller 10 of the present invention, an elastic layer 2, an intermediate layer 3, and a surface layer 4 are successively laminated on the outer periphery of a shaft 1.

In the present invention, it is important that the surface layer 4 contain a urethane (meth)acrylate oligomer obtained by allowing polybutadiene polyol or hydrogenated polybutadiene polyol, polyisocyanate, and (meth)acrylate having a hydroxyl group to react. By using a highly hydrophobic material, in particular, a polybutadiene polyol as a polyol component of the source of urethane (meth)acrylate oligomer constituting an ultraviolet (UV) curable resin to be used for the surface layer 4, the surface layer 4 can have a high resistance value, in other words, high insulation properties. The surface potential of the surface layer 4 is determined by the resistance value and the density of amide bond in the polyol. In particular, when polybutadiene polyol-based material is used, it is possible to maintain a high surface potential even when there are few amide bonds. Therefore, by the present invention, a high resistance value and a high surface potential can be secured in the surface layer 4. By this, in the developing roller, electrification properties of the toner is maintained, and the printing quality, in particular, the one-dot level fine line printing quality can be improved without the occurence of durable printing fog or the like.

For the polybutadiene polyol or the hydrogenated polybutadiene polyol to be used for the above-mentioned surface layer 4, those having a weight-average molecular weight of 1200 to 20000 are preferred. When the weight-average molecular weight is too small, the hardened film is likely to break, which causes surface layer scraping. On the other hand, in order to increase the weight-average molecular weight, the polyol/isocyanate ratio needs to be increased, and the compatibility of hydrophobic polybutadiene polyol and hydrophilic isocyanate deteriorates, which increases unreacted components. This causes adherence of toner, which adversely affect the printing quality. For this reason, it is not preferable that the weight-average molecular weight is out of the above-mentioned range.

In the present invention, for the surface layer 4, the above-mentioned polybutadiene-based polyol is used, whereby an expected effect of the present invention can be obtained. The ratio of polyol and polyisocyanate, the type of isocyanate, or the like at the time of synthesis of the above-mentioned urethane (meth)acrylate oligomer is not particularly restricted. More concretely, the surface layer 4 of the roller of the present invention can be formed from a composition for forming a surface layer containing a UV curable resin and a photopolymerization initiator and not containing a conductive agent.

In the present invention, the UV curable resin to be used for the intermediate layer 3, is not particularly restricted as long as it contains a urethane (meth)acrylate oligomer using the above-mentioned polybutadiene-based polyol, and those containing (A) a urethane (meth)acrylate oligomer and (B) a (meth)acrylate monomer can be suitably used.

The above-mentioned (A) urethane (meth)acrylate oligomer is a compound which includes one or more of an acryloyloxy group(s) ($CH_2$=CHCOO—) or a methacryloyloxy group(s) ($CH_2$=C($CH_3$)COO—) and a plurality of urethane bonds (—NHCOO—). The number of functional groups of (A) the urethane (meth)acrylate oligomer is preferably 3.0 or less, in particular, 1.5 to 2.5. Herein, the term "functional group" refers to an acryloyloxy group and a methacryloyloxy group; the term "the number of functional groups" refers to the average number of functional groups. Since when the number of functional groups of the (A) urethane (meth)acrylate oligomer is 3.0 or less, the crosslink density in the UV curable resin is appropriately increased, the amount of acetone extract can be reduced without increasing the hardness of the layer, thereby obtaining an effect of improving staining properties against neighboring members such as a photoreceptor. When the (A) urethane (meth)acrylate oligomer contains a trifunctional urethane (meth)acrylate oligomer, the hardness of the layer may be increased.

The (A) urethane (meth)acrylate oligomer preferably has a number average molecular weight of 5,000 to 100,000 based on polystyrene. When the molecular weight of the (A) urethane (meth)acrylate oligomer is smaller than 5,000, the hardness of the layer may become too high. On the other hand, when the molecular weight of the (A) urethane (meth)acrylate oligomer is higher than 100,000, the compression set of the layer may become too high.

As the above-mentioned (A) urethane (meth)acrylate oligomer, for example, those manufactured by synthesizing a urethane prepolymer from the above-mentioned polybutadiene-based polyol and a polyisocyanate, and then adding (meth)acrylate having a hydroxyl group to the thus obtained urethane prepolymer can suitably used, but are not particularly restricted thereto.

The polyisocyanate used for the synthesis of the above-mentioned urethane prepolymer is a compound having a plurality of isocyanate groups (NCO group). Specific examples of such a polyisocyanate include tolylene diisocyanate (TDI), diphenylmethane diisocyanate (MDI), crude diphenylmethane diisocyanate (crude MDI), isophorone diisocyanate (IPDI), hydrogenated diphenylmethane diisocyanate, hydrogenated tolylene diisocyanate, hexamethylene diisocyanate (HDI) and modified isocyanurates, modified carbodiimides, and modified glycols thereof. These polyisocyanates may be used singly, or two or more thereof may be used in blend.

Here, the above-mentioned urethane prepolymer preferably has an isocyanate index of in the range of from 110 to 200, more preferably in the range of from 115 to 200. The term "isocyanate index" represents a value calculated using (B/A)×100, where the number of OH groups of the polyol is A and the number of NCO groups of the polyisocyanate is B. When the isocyanate index of a urethane prepolymer is less than 110, the compression set is increased and image defect is likely to occur. On the other hand, when the isocyanate index is higher than 200, isocyanate which is not reacted with polyol increases and the physical properties thereof deteriorates.

In the synthesis of the above-mentioned urethane prepolymer, a catalyst for urethanation reaction is preferable used. Examples of such a catalyst for urethanation reaction include an organic tin compound such as dibutyltin dilaurate, dibutyltin diacetate, dibutyltin thiocarboxylate, dibutyltin dimaleate, dioctyltin thiocarboxylate, tin octenoate, and monobutyltin oxide; an inorganic tin compound such as stannous chloride; an organic lead compound such as lead octenoate; monoamines such as triethyl amine and dimethylcyclohexylamine; diamines such as tetramethylethylenediamine, tetramethylpropanediamine, and tetramethylhexanediamine; triamines such as pentamethyldiethylenetriamine, pentamethyldipropylenetriamine, and tetramethylguanidine; cyclic amines such as triethylenediamine, dimethylpiperazine, methylethylpiperazine, methylmorpholine, dimethylaminoethylmorpholine, dimethylimidazole, and pyridine; alcohol amines such as dimethylaminoethanol, dimethylaminoethoxyethanol, trimethylaminoethyl ethanolamine, methyl hydroxyethyl piperazine, and hydroxyethyl morpholine; ether amines such as bis(dimethylaminoethyl)ether, and ethylene glycol bis(dimethyl) aminopropyl ether; organic sulfonic acids such as p-toluene sulfonic acid, methane sulfonic acid, and fluorosulfuric acid; inorganic acids such as sulfuric acid, phosphoric acid, and perchloric acid; bases such as sodium alcoholate, lithium hydroxide, aluminum alcoholate, and sodium hydroxide; titanium compounds such as tetrabutyl titanate, tetraethyl titanate, and tetraisopropyl titanate; bismuth compounds; and quaternary ammonium salts. Among these catalysts, organic tin compounds are preferred. These catalysts may be used singly, or two of more thereof may be used in combination. The amount of the above-mentioned catalyst to be used is preferably in the range of from 0.001 to 2.0 parts by mass with respect to 100 parts by mass of the above-mentioned polyol.

(Meth)acrylate having a hydroxyl group which is to be added to the above-mentioned urethane prepolymer is a compound having one or more hydroxyl group(s) and one or more acryloyloxy group(s) ($CH_2$=CHCOO—) or methacryloyloxy group(s) ($CH_2$=C($CH_3$)COO—). Such (meth)acrylate having a hydroxyl group can be added to an isocyanate group of the above-mentioned urethane prepolymer. Examples of such (meth)acrylate having a hydroxyl group include 2-hydroxyethyl (meth)acrylate and 2-hydroxypropyl (meth)acrylate. These acrylates having a hydroxyl group may be used singly, or two or more thereof may be used in combination.

The above-mentioned (B) (meth)acrylate monomer is a monomer having one or more acryloyloxy group(s) ($CH_2$=CHCOO—) or methacryloyloxy group(s) ($CH_2$=C($CH_3$)COO—). The (B) (meth)acrylate monomer functions as a reactive diluent, in other words, is cured by UV and, at the same time, is capable of decreasing the viscosity of the composition for forming the surface layer.

The number of functional groups of the above-mentioned (B) (meth)acrylate monomer is preferably 3.0 or less, and more preferably from 1 to 2. Here, the term "functional group" refers to an acryloyloxy group and a methacryloyloxy group; the term "the number of functional groups" refers to the average number of functional groups. Since when the number of functional groups of (B) (meth)acrylate monomer is less than 3.0, the crosslink density in UV curable resin is appropriately increased, the amount of acetone extract can be reduced without increasing the hardness of the layer, thereby obtaining an effect of improving staining properties against neighboring members such as a photoreceptor. When the above-mentioned (B) (meth)acrylate monomer include a bifunctional (meth)acrylate monomer, the content of bifunctional (meth)acrylate monomer in the total of the above-mentioned urethane (meth)acrylate oligomer (A) and the (meth)acrylate monomer (B) is preferably from 1 to 15% by mass. When the content of the bifunctional (meth)acrylate monomer is less than 1% by mass, the crosslink density in UV curable resin can not be sufficiently increased. On the other hand, when the content of the bifunctional (meth)acrylate monomer is more than 15% by mass, the crosslink density becomes too high, which may increase the hardness of the layer.

The above-mentioned (B) (meth)acrylate monomer preferably has a glass-transition temperature (Tg) of lower than 50° C. Here, the (B) (meth)acrylate monomer having a glass-transition temperature (Tg) of 50° C. or lower, generally have a characteristic that a portion in the monomer molecule excluding the above-mentioned functional group accounts for much. When the (B) (meth)acrylate monomer and the (A) urethane (meth)acrylate oligomer are polymerized, motion of a portion of the (B) (meth)acrylate monomer excluding the functional group in the polymer becomes large, and as the result, the hardness of the layer is reduced.

Examples of the above-mentioned (B) (meth)acrylate monomer include lauryl (meth)acrylate, isomyristyl (meth)acrylate, methoxy triethylene glycol (meth)acrylate, triethylene glycol di(meth)acrylate, β-(meth)acryloyloxyethyl hydrogen succinate, isobornyl (meth)acrylate, ethyl (meth)acrylate, isobutyl (meth)acrylate, n-butyl (meth)acrylate, isoamyl (meth)acrylate, glycidyl (meth)acrylate, butoxy ethyl (meth)acrylate, ethoxy diethylene glycol (meth)acrylate, methoxy dipropylene glycol (meth)acrylate, phenoxy ethyl (meth)acrylate, 2-hydroxyethyl (meth)acrylate, and 2-hydroxypropyl (meth)acrylate. These (B) (meth)acrylate monomers may be used singly, or two or more thereof may be used in combination.

In the present invention, the ratio of (A) urethane (meth)acrylate oligomer with respect to the total amount of the (A) urethane (meth)acrylate oligomer and the (B) (meth)acrylate monomer is preferably 50% by mass or higher, and more preferably, from 60 to 90% by mass. When the content of the (A) urethane (meth)acrylate oligomer is less than 50% by mass, the percentage of monomer is increased, which increases a low-molecular polymer. As the result, the amount of acetone extract may be increased.

The photopolymerization initiator which is to be used for the surface layer 4 has a function of initializing polymerization of the above-mentioned (A) urethane (meth)acrylate oligomer and (B) (meth)acrylate monomer by irradiation of ultraviolet ray. Examples of such a photopolymerization initiator include 4-dimethylamino benzoic acid, 4-dimethylamino benzoic acid ester, 2,2-dimethoxy-2-phenylacetophenone, acetophenone diethylketal, alkoxy acetophenone, benzyl dimethyl ketal, benzophenone and benzophenone derivatives such as 3,3-dimethyl-4-methoxy benzophenone, 4,4-dimethoxy benzophenone, and 4,4-diamino benzophenone, benzoyl benzoic acid alkyl, bis(4-dialkylaminophenyl) ketone, benzyl and benzyl derivatives such as benzyl methyl ketal, benzoine and benzoine derivatives such as benzoine isobutyl ether, benzoine isopropyl ether, 2-hydroxy-2-methylpropiophenone, 1-hydroxycyclohexyl phenyl ketone, xanthone, thioxanthone and thioxanthone derivative, fluorene, 2,4,6-trimethylbenzoyl diphenylphosphine oxide, bis(2,6-dimethoxy benzoyl)-2,4,4-trimethylpentyl phosphine oxide, bis(2,4,6-trimethylbenzoyl)-phenylphosphine oxide, 2-methyl-1-(4-(methylthio)phenyl)-2-morpholino propane-1,2-benzyl-2-dimethylamino-1-(morpholino phenyl)-butanone-1. Specific examples thereof include IRGACURE 651, 184, 500, 2959, 127, 1800, 784, 907, 369, 379, 819, DAROCUR 1173, 4265, TPO (each manufactured by BASF Japan Ltd.). These photopolymerization initiators may be used singly, or two or more thereof may be used in combination. The compounding ratio of the photopolymerization initiator in the composition for forming an elastic layer is preferably in the range of from 0.2 to 5.0 parts by mass, in particular, from 0.5 to 2 parts by mass with respect to the total 100 parts by mass of the above-mentioned (A) urethane (meth)acrylate oligomer and the above-mentioned (B) (meth)acrylate monomer which constitute the UV curable resin.

For the composition for forming a surface layer, 0.001 to 0.2 parts by mass of polymerization inhibitor may be further added with respect to the total 100 parts by mass of (A) urethane (meth)acrylate oligomer and (B) (meth)acrylate monomer which constitute the UV curable resin. By adding the polymerization inhibitor, thermal polymerization before irradiation of ultraviolet can be prevented. Examples of such a polymerization inhibitor include hydroquinone, hydroquinone monomethyl ether, p-methoxyphenol, 2,4-dimethyl-6-t-butylphenol, 2,6-di-t-butyl-p-cresol, butyl hydroxy anisole, 3-hydroxy thiophenol, α-nitroso-β-naphtol, p-benzoquinone, and 2,5-dihydroxy-p-quinone.

Further, to the composition for forming a surface layer, a variety of known additives other than the above can be added as long as an expected effect of the present invention is not undermined. In the present invention, the thickness of the surface layer 4 is suitably from 1 to 20 μm.

Next, the elastic layer 2 of the roller of the present invention can be formed from a composition for forming an elastic layer containing a UV curable resin, a photopolymerization initiator, and an ionic conductive agent. For such UV curable resin, a substantially similar UV curable resin to those used for the above-mentioned surface layer 4 except that a polyol to be used is not limited to the above-mentioned polybutadiene-based polyol can be used.

In the elastic layer 2, polyol to be used for the synthesis of the above-mentioned urethane prepolymer is a compound which include a plurality of hydroxyl groups (OH group). Specific example of such a polyol include polyether polyol, polyester polyol, polytetramethylene glycol, polybutadiene polyol, alkylene oxide-modified polybutadiene polyol and polyisoprene polyol. Thereamong, polyether polyol is particularly preferable. Specific examples of polyether polyol suitably include polyoxypropylene glycol, polyoxyethylene glycol, polyoxymethylene glycol, polyoxytetramethylene glycol, polyoxybutylene glycol. By selecting these suitable polyether polyols as the polyol used for the synthesis of the above-mentioned urethane prepolymer, the hydrophobicity of the layer is increased to obtain an effect of making it hard for the layer to uptake water. Consequently, the layer exhibits resistance to deteriorative reaction such as hydrolysis, and the amount of acetone extract can be reduced. As the result, an effect of improving staining properties against neighboring members such as a photoreceptor can be obtained. The above-mentioned polyether polyol is obtained by, for example, adding an alkylene oxide such as ethylene oxide propylene oxide to a polyhydric alcohol such as ethylene glycol, propylene glycol, and glycerin. These polyols may be used singly, or two or more thereof may be used in blend.

In the elastic layer 2, polyol to be used for the synthesis of the above-mentioned urethane prepolymer preferably has a molecular weight in the range of from 500 to 15,000. When the molecular weight of polyol used for the synthesis of urethane prepolymer is smaller than 500, the hardness of the layer is increased, which is not appropriate for the layer of the developing roller. On the other hand, when the molecular weight is higher than 15,000, the compression set is increased and image defect is likely to occur.

As the photopolymerization initiator to be used for the elastic layer 2, those similar to the one used for the above-mentioned surface layer 4 can be used and not particularly restricted. The compounding ratio thereof can also be appropriately selected in a range similar to the case of the surface layer 4.

The ionic conductive agent to be used for the elastic layer 2 has a function of imparting an electrical conductivity to the elastic layer. Since the ionic conductive agent is dissolved in the (A) urethane (meth)acrylate oligomer and at the same time has transparency, an ultraviolet ray reaches sufficiently inside the coating film even when a composition for forming an elastic layer is applied thickly on a shaft and the composition for forming an elastic layer can be sufficiently cured. Examples of such an ionic conductive agent include ammonium salts such as perchlorate, chlorate, hydrochloride, bromate, iodate, hydrofluoroboride, sulfate, ethyl sulfate, carboxylate, or sulfonate of tetraethylammonium, tetrabutylammonium, dodecyl trimethyl ammonium, hexadecyl trimethyl ammonium, benzyl trimethyl ammonium, or modified fatty acid dimethyl ethyl ammonium; perchlorate, chlorate, hydrochloride, bromate, iodate, hydrofluoroboride, sulfate, trifluoromethyl sulfate, or sulfonate of alkali metal or alkali earth metal such as lithium, sodium, potassium, calcium, or magnesium.

Thereamong, examples of a suitable ionic conductive agent in the present invention include sodium perchlorate (MP-100, manufactured by Showa Chemical Industry Co., Ltd.) and acrylic monomer solution of lithium imide (Sankonol MTGA-50R, manufactured by Sanko Chemical Industry Co., Ltd.). These conductive agents may be used alone, or two or more thereof may be used in combination. The compounding ratio of the ionic conductive agent in the composition for forming an elastic layer depends on the types thereof, and is preferably in the range of from 0.1 to 5.0 parts by mass, in particular from 0.4 to 2.0 parts by mass, and further, from 0.4 to 1.2 parts by mass with respect to the total 100 parts by mass of (A) urethane (meth)acrylate oligomer and (B) (meth)acrylate monomer which constitute the UV curable resin.

To the composition for forming an elastic layer, a variety of known additives other than the above can be added as long as an expected effect of the present invention is not undermined. In the present invention, the thickness of the elastic layer 2 is suitably from 0.5 to 4 mm.

Next, the intermediate layer 3 in the roller of the present invention can be formed from a composition for forming the intermediate layer containing a UV curable resin, a photopolymerization initiator and a conductive agent. For such a UV curable resin and photopolymerization initiator, those similar to the one used for the above-mentioned surface layer or elastic layer can be used but not particularly restricted.

For the conductive agent used for the intermediate layer 3, a variety of carbon blacks such as electrically conductive carbon black such as ketjen black, acetylene black; carbon black for rubber such as SAF, ISAF, HAF, FEF, GPF, SRF, FT, or MT; carbon black for ink such as oxidized carbon black; and thermally decomposed carbon black can be used. The compounding ratio of such carbon black is in the range of 1 part by mass or more, suitably from 2 to 15 parts by mass, and more suitably from 2 to 6 parts by mass with respect to the total 100 parts by mass of (A) urethane (meth)acrylate oligomer and (B) (meth)acrylate monomer which constitute the UV curable resin. In the present invention, by adding a carbon black in an amount in the above-mentioned range, the resistance value of the intermediate layer 3 is reduced to thereby obtain a desired resistance value as a whole roller and to obtain an effect of inhibiting change in the roller resistance due to environmental variation. It is noted that when the compounding ratio of the carbon black is too high, poor curing of the intermediate layer 3 may occur.

For the photopolymerization initiator used for the intermediate layer 3, those similar to the one used for the above-mentioned surface layer 4 or elastic layer 2 can be used, but not particularly restricted. Suitably, a photopolymerization initiator having an absorption coefficient at 254 nm of $2\times10^4$ ml/g·cm or higher and a photopolymerization initiator having an absorption coefficient at 365 nm of $4\times10^2$ ml/g·cm or higher are used in combination. Generally, when a layer containing carbon black is irradiated with a UV light, the UV light does not reach inside the layer and poor curing of the resin may occur. By using such plural photopolymerization initiators in combination, curing reaction is allowed to proceed by absorbing lights having a plurality of wavelengths. Even a layer containing more than a predetermined amount of carbon black as a conductive agent can efficiently absorb a light emitted from a light source thereby to surely complete the UV curing of the resin. A photopolymerization initiator having high absorption coefficient at 254 nm and a photopolymerization initiator having high absorption coefficient at 365 nm are dealt with because these wavelengths, 254 nm and 365 nm are main emission wavelengths of a common UV light source.

Examples of a photopolymerization initiator having an absorption coefficient at 254 nm of $2\times10^4$ ml/g·cm or higher include IRGACURE 651, 184, 500, 2959, 127, 1800, 784, DAROCUR 1173, 4265 (each manufactured by BASF Japan Ltd.). Examples of a photopolymerization initiator having an absorption coefficient at 365 nm of $4\times10^2$ ml/g·cm or higher include IRGACURE 907, 369, 379, 819, 1800, 784, DAROCUR 4265, TPO (each manufactured by BASF Japan Ltd.). The compounding ratios of these two types of photopolymerization initiators in the composition for forming the intermediate layer are preferably in the range of 0.2 to 5.0 parts by mass, in particular, 0.5 to 2 parts by mass with respect to the total 100 parts by mass of (A) urethane (meth)acrylate oligomer and (B) (meth)acrylate monomer which constitute the UV curable resin.

Further, to the composition for forming an intermediate layer, a variety of known additives other than the above can be added as long as an expected effect of the present invention is not undermined. In the present invention, the thickness of the intermediate layer 3 is suitably from 1 to 10 μm.

The shaft 1 used for the developing roller of the present invention is not particularly restricted as long as it has a good electrical conductivity, and any of a metal shaft, a metal shaft on the outer periphery of which a highly rigid resin base is arranged, those constituted only by a highly rigid resin base, a metal or highly rigid resin cylinder the inside of which is hollowed out may be used.

Examples of the material of the above-mentioned metal shaft or metal cylinder include iron, stainless steel, aluminum. Examples of the above-mentioned highly rigid resin include polyacetal, polyamide 6, polyamide 6.6, polyamide 12, polyamide 4.6, polyamide 6.10, polyamide 6.12, polyamide 11, polyamide MXD6, polybutylene terephthalate, polyphenylene oxide, polyphenylene sulfide, polyether sulfone, polycarbonate, polyimide, polyamide-imide, polyether-imide, polysulfone, polyetheretherketone, polyethylene terephthalate, polyarylate, liquid crystal polymer, polytetrafluoroethylene, polypropylene, acrylonitrile butadiene styrene (ABS) resin, polystyrene, polyethylene, melamine resin, phenol resin, and silicone resin. Thereamong, polyacetal, polyamide 6.6, polyamide MXD6, polyamide 6.12, polybutylene terephthalate, polyphenylene ether, polyphenylene sulfide, and polycarbonate are suitable. These highly rigid resins may be used singly, or two or more thereof may be used in combination.

When a highly rigid resin is used for the shaft 1, it is preferable that a conductive agent be added and dispersed in the highly rigid resin to sufficiently secure the electrical conductivity. For the conductive agent to be dispersed in the highly rigid resin, metal powders such as carbon black powder, graphite powder, carbon fiber, aluminum, copper, and nickel; metal oxide powders such as tin oxide, titanium oxide, and zinc oxide; and powdery conductive agents such as electrically conductive glass powder are preferable. These conductive agent may be used singly, or two or more thereof may be used in combination. The compounding ratio of the conductive agent is not particularly restricted, and preferably in the range of from 5 to 40% by mass, and more preferably from 5 to 20% by mass with respect to the total highly rigid resin composition.

The external diameter of the shaft 1 is preferably in the range of from 5 to 20 mm, in particular, from 5 to 10 mm. When a resin material is used for the shaft 1, there is an advantage that even when the external diameter of the shaft 1 is increased, increase in the mass of the shaft 1 can be inhibited.

In the developing roller of the present invention, the resistance value under conditions at a temperature of 10° C. and at a humidity of 15% RH is preferably $10^4$ to $10^8 \Omega$, in particular, $10^5$ to $10^8 \Omega$ and further, $10^5$ to $10^7 \Omega$. By this, the printed image quality under low-temperature and low-humidity environment can be made favorable.

The developing roller of the present invention can be manufactured by suitably, using the above-mentioned composition for forming the elastic layer, the composition for forming the intermediate layer and the composition for forming the surface layer and by forming successively on the outer periphery of the shaft 1 the elastic layer 2, the intermediate layer 3, and the surface layer 4. Concretely, first, the above-mentioned composition for forming the elastic layer is applied on the outer periphery of the shaft 1, and then it is irradiated with a UV light to cure, thereby forming the elastic layer 2. Next, on the outer periphery of the formed elastic layer 2, the above-mentioned composition for forming the intermediate layer is applied and then it is irradiated with a UV light to form the intermediate layer 3. Further, the above-mentioned composition for forming the surface layer is applied on the outer periphery of the formed intermediate layer 3, and then it is irradiated with a UV light to cure to form the surface layer 4, whereby a suitable developing roller of the present invention can be obtained. Since in the developing roller of the present invention, the elastic layer 2 or, in particular, whole layers further composed of the intermediate layer 3 and the surface layer 4 can be formed by using a UV curable resin, a large amount of thermal energy is not needed for manufacturing thereof and the manufacturing of the roller can be performed in a short time. Since curing furnace or the like for the formation of each layer is not needed, a large amount of equipment cost is not needed.

In the present invention, examples of a method of applying a composition for forming each layer on the outer periphery of a shaft or the like include a spraying method, a roll coater method, a dipping method, a die coating method. Thereamong, a die coating method is preferable. By employing a die coating method, each layer can be quickly and surely applied with the composition, thereby considerably improving the work efficiency during manufacturing of the roller.

In the present invention, the UV light source used for curing each layer is not particularly restricted, and examples thereof include a mercury lamp, a high pressure mercury lamp, an ultrahigh pressure mercury lamp, a metal halide lamp, and a xenon lamp. In particular, for the UV light source used for curing the intermediate layer, electrodeless UV lamp manufactured by Heraeus Noblelight Fusion UV Inc. is suitable since it has emission wavelengths centering at 254 nm or 365 nm and the amount of light is large. Thereamong, H bulb or D bulb can be suitably used. When a common mercury filled UV lamp is used, since a low pressure mercury lamp only has an emission wavelength of as short as about 254 nm, the lamp is not suited for curing the intermediate layer. Accordingly, for curing the intermediate layer, a high pressure mercury lamp having a long emission wavelength of about 365 nm is preferably used. Irradiation conditions such as the irradiation intensity and the integral light intensity at the time of UV light irradiation can be appropriately selected depending on the components contained in the composition for forming each layer, the composition, the application amount, or the like, but are not particularly restricted.

Second Embodiment

The second embodiment of the present invention will now be described.

FIG. 1 illustrates a longitudinal sectional view relating to one example of the developing roller of the present invention. As illustrated, a developing roller 10 of the present invention at least comprises an elastic layer 2 on the periphery of a shaft 1, and suitably, an intermediate layer 3 and a surface layer 4 are further successively laminated thereon.

In the present invention, it is important that elastic layer 2 contains an ultraviolet (UV) curable resin and an ionic conductive agent, and when the surface thereof is electrified by corona discharge at 8 kV from a position 1 mm away from the surface under conditions at a temperature of 32.5° C. and at a humidity of 80% RH, the surface potential 0.4 seconds thereafter is 25 V or higher. By maintaining high the surface potential of the developing roller under high-temperature and high-humidity environment for a certain period of time after electrification by using such provisions, toner is surely held on the surface of the developing roller and does not move onto the image holding body. Consequently, the occurrence of fogging under high-temperature and high-humidity environment is inhibited and a good printed image quality can be achieved. In the present invention, unlike a conventional technique in which the toner electrification amount is improved, deterioration of an image under low-temperature and low-humidity environment does not occur.

In the present invention, the surface potential 0.4 seconds thereafter electrification under the above-mentioned predetermined conditions is suitably 25 to 100 V, more suitably 40 to 100 V, and further suitably 60 to 100 V. When the surface potential is less than 25 V, an effect of inhibiting the occurrence fogging is not obtained. On the other hand, since when the surface potential is too high, the electrostatic adhesion of toner becomes too strong under low-temperature and low-humidity environment and deterioration of printing quality such as decrease in printing density occurs, which is not preferable. The case under conditions at a temperature of 32.5° C. and at a humidity of 80% RH is dealt with here to clarify the conditions of high-temperature and high-humidity environment. The electrification condition is the case in which the surface electrified by corona discharge at 8 kV from a position 1 mm away from the surface, which is defined as a common electrification condition in an actual image forming apparatus. Further, the surface potential 0.4 seconds thereafter is dealt with because it takes about 0.4 seconds after the roller surface is electrified by corona discharge until an image holding body and an electrification portion of the surface of a developing roller are close to each other.

In the present invention, by constituting the elastic layer 2 using a UV curable resin and an ionic conductive agent as main constituents, a developing roller satisfying conditions relating to the above-mentioned surface potential can be obtained. More concretely, in the present invention, the elastic layer 2 is formed from a composition for forming an elastic layer containing a UV curable resin, a photopolymerization initiator and an ionic conductive agent The UV curable resin to be used for the elastic layer 2, is not particularly restricted for example, those containing (A) a urethane (meth)acrylate oligomer and (B) a (meth)acrylate monomer can be suitably used.

The above-mentioned (A) urethane (meth)acrylate oligomer is a compound which includes one or more of an acryloyloxy group(s) ($CH_2$=CHCOO—) or a methacryloyloxy group(s) ($CH_2$=C($CH_3$)COO—) and a plurality of urethane bonds (—NHCOO—). The number of functional groups of (A) the urethane (meth)acrylate oligomer is preferably 3.0 or less, in particular, 1.5 to 2.5. Herein, the term "functional group" refers to an acryloyloxy group and a methacryloyloxy group; the term "the number of functional groups" refers to the average number of functional groups. Since when the number of functional groups of the (A) urethane (meth)acrylate oligomer is 3.0 or less, the crosslink density in the UV curable resin is appropriately increased, the amount of acetone extract can be reduced without increasing the hardness of the layer, thereby obtaining an effect of improving staining properties against neighboring members such as a photoreceptor. When the (A) urethane (meth)acrylate oligomer contains a trifunctional urethane (meth)acrylate oligomer, the hardness of the layer may be increased.

The (A) urethane (meth)acrylate oligomer preferably has a number average molecular weight of 5,000 to 100,000 based on polystyrene. When the molecular weight of the (A) urethane (meth)acrylate oligomer is smaller than 5,000, the hardness of the layer may become too high. On the other hand, when the molecular weight of the (A) urethane (meth)acrylate oligomer is higher than 100,000, the compression set of the layer may become too high.

As the above-mentioned (A) urethane (meth)acrylate oligomer, for example, those manufactured by synthesizing a urethane prepolymer from the above-mentioned polybutadiene-based polyol and a polyisocyanate, and then adding (meth)acrylate having a hydroxyl group to the thus obtained urethane prepolymer can suitably used, but are not particularly restricted thereto.

Polyol to be used for the synthesis of the above-mentioned urethane prepolymer is a compound which include a plurality of hydroxyl groups (OH group). Specific example of such a polyol include polyether polyol, polyester polyol, polytetramethylene glycol, polybutadiene polyol, alkylene oxide-modified polybutadiene polyol and polyisoprene polyol. Thereamong, polyether polyol is particularly preferable. Specific examples of polyether polyol suitably include polyoxypropylene glycol, polyoxyethylene glycol, polyoxymethylene glycol, polyoxytetramethylene glycol, polyoxybutylene glycol. By selecting these suitable polyether polyols as the polyol used for the synthesis of the above-mentioned urethane prepolymer, the hydrophobicity of the layer is increased to obtain an effect of making it hard for the layer to uptake water. Consequently, the layer exhibits resistance to deteriorative reaction such as hydrolysis, and the amount of acetone extract can be reduced. As the result, an effect of improving staining properties against neighboring members such as a photoreceptor can be obtained. The above-mentioned polyether polyol is obtained by, for example, adding an alkylene oxide such as ethylene oxide propylene oxide to a polyhydric alcohol such as ethylene glycol, propylene glycol, and glycerin. These polyols may be used singly, or two or more thereof may be used in blend.

Polyol to be used for the synthesis of the above-mentioned urethane prepolymer preferably has a molecular weight in the range of from 500 to 15,000. When the molecular weight of polyol used for the synthesis of urethane prepolymer is smaller than 500, the hardness of the layer is increased, which is not appropriate for the layer of the developing roller. On the other hand, when the molecular weight is higher than 15,000, the compression set is increased and image defect is likely to occur.

The polyisocyanate used for the synthesis of the above-mentioned urethane prepolymer is a compound having a plurality of isocyanate groups (NCO group). Specific examples of such a polyisocyanate include tolylene diisocyanate (TDI), diphenylmethane diisocyanate (MDI), crude diphenylmethane diisocyanate (crude MDI), isophorone diisocyanate (IPDI), hydrogenated diphenylmethane diisocyanate, hydrogenated tolylene diisocyanate, hexamethylene diisocyanate (HDI) and modified isocyanurates, modified carbodiimides, and modified glycols thereof. These polyisocyanates may be used singly, or two or more thereof may be used in blend.

In the synthesis of the above-mentioned urethane prepolymer, the ratio of polyol and polyisocyanate can be appropriately selected depending on applications. Here, the above-mentioned urethane prepolymer preferably has an isocyanate index of in the range of from 110 to 200, more preferably in the range of from 115 to 200. The term "isocyanate index" represents a value calculated using (B/A)×100, where the number of OH groups of the polyol is A and the number of NCO groups of the polyisocyanate is B. When the isocyanate index of a urethane prepolymer is less than 110, the compression set is increased and image defect is likely to occur. On the other hand, when the isocyanate index is higher than 200, isocyanate which is not reacted with polyol increases and the physical properties thereof deteriorates.

In the synthesis of the above-mentioned urethane prepolymer, a catalyst for urethanation reaction is preferable used. Examples of such a catalyst for urethanation reaction include an organic tin compound such as dibutyltin dilaurate, dibutyltin diacetate, dibutyltin thiocarboxylate, dibutyltin dimaleate, dioctyltin thiocarboxylate, tin octenoate, and monobutyltin oxide; an inorganic tin compound such as stannous chloride; an organic lead compound such as lead octenoate; monoamines such as triethyl amine and dimethylcyclohexylamine; diamines such as tetramethylethylenediamine, tetramethylpropanediamine, and tetramethylhexanediamine; triamines such as pentamethyldiethylenetriamine, pentamethyldipropylenetriamine, and tetramethylguanidine; cyclic amines such as triethylenediamine, dimethylpiperazine, methylethylpiperazine, methylmorpholine, dimethylaminoethylmorpholine, dimethylimidazole, and pyridine; alcohol amines such as dimethylaminoethanol, dimethylaminoethoxyethanol, trimethylaminoethyl ethanolamine, methyl hydroxyethyl piperazine, and hydroxyethyl morpholine; ether amines such as bis(dimethylaminoethyl)ether, and ethylene glycol bis(dimethyl) aminopropyl ether; organic sulfonic acids such as p-toluene sulfonic acid, methane sulfonic acid, and fluorosulfuric acid; inorganic acids such as sulfuric acid, phosphoric acid, and perchloric acid; bases such as sodium alcoholate, lithium hydroxide, aluminum alcoholate, and sodium hydroxide; titanium compounds such as tetrabutyl titanate, tetraethyl titanate, and tetraisopropyl titanate; bismuth compounds; and quaternary ammonium salts. Among these catalysts, organic tin compounds are preferred. These catalysts may be used singly, or two of more thereof may be used in combination. The amount of the above-mentioned catalyst to be used is preferably in the range of from 0.001 to 2.0 parts by mass with respect to 100 parts by mass of the above-mentioned polyol.

(Meth)acrylate having a hydroxyl group which is to be added to the above-mentioned urethane prepolymer is a compound having one or more hydroxyl group(s) and one or more acryloyloxy group(s) ($CH_2$=CHCOO—) or methacryloyloxy group(s) ($CH_2$=C($CH_3$)COO—). Such (meth)acrylate having a hydroxyl group can be added to an isocyanate group of the above-mentioned urethane prepolymer. Examples of such (meth)acrylate having a hydroxyl group include 2-hydroxyethyl (meth)acrylate and 2-hydroxypropyl (meth)acrylate. These acrylates having a hydroxyl group may be used singly, or two or more thereof may be used in combination.

The above-mentioned (B) (meth)acrylate monomer is a monomer having one or more acryloyloxy group(s) ($CH_2$=CHCOO—) or methacryloyloxy group(s) ($CH_2$=C($CH_3$)COO—). The (B) (meth)acrylate monomer functions as a reactive diluent, in other words, is cured by UV and, at the same time, is capable of decreasing the viscosity of the composition for forming the elastic layer.

The number of functional groups of the above-mentioned (B) (meth)acrylate monomer is preferably 3.0 or less, and more preferably from 1 to 2. Here, the term "functional group" refers to an acryloyloxy group and a methacryloyloxy group; the term "the number of functional groups" refers to the average number of functional groups. Since when the number of functional groups of (B) (meth)acrylate monomer is less than 3.0, the crosslink density in UV curable resin is appropriately increased, the amount of acetone extract can be reduced without increasing the hardness of the layer, thereby obtaining an effect of improving staining properties against neighboring members such as a photoreceptor. When the above-mentioned (B) (meth)acrylate monomer include a bifunctional (meth)acrylate monomer, the content of bifunctional (meth)acrylate monomer in the total of the above-mentioned urethane (meth)acrylate oligomer (A) and the (meth)acrylate monomer (B) is preferably from 1 to 15 mass. When the content of the bifunctional (meth)acrylate monomer is less than 1% by mass, the crosslink density in UV curable resin can not be sufficiently increased. On the other hand, when the content of the bifunctional (meth)acrylate monomer is more than 15% by mass, the crosslink density becomes too high, which may increase the hardness of the layer.

The above-mentioned (B) (meth)acrylate monomer preferably has a glass-transition temperature (Tg) of lower than 50° C. Here, the (B) (meth)acrylate monomer having a glass-transition temperature (Tg) of 50° C. or lower, generally have a characteristic that a portion in the monomer molecule excluding the above-mentioned functional group accounts for much. When the (B) (meth)acrylate monomer and the (A) urethane (meth)acrylate oligomer are polymerized, motion of a portion of the (B) (meth)acrylate monomer excluding the functional group in the polymer becomes large, and as the result, the hardness of the layer is reduced.

Examples of the above-mentioned (B) (meth)acrylate monomer include lauryl (meth)acrylate, isomyristyl (meth)acrylate, methoxy triethylene glycol (meth)acrylate, triethylene glycol di(meth)acrylate, β-(meth)acryloyloxyethyl hydrogen succinate, isobornyl (meth)acrylate, ethyl (meth)acrylate, isobutyl (meth)acrylate, n-butyl (meth)acrylate, isoamyl (meth)acrylate, glycidyl (meth)acrylate, butoxy ethyl (meth)acrylate, ethoxy diethylene glycol (meth)acrylate, methoxy dipropylene glycol (meth)acrylate, phenoxy ethyl (meth)acrylate, 2-hydroxyethyl (meth)acrylate, and 2-hydroxypropyl (meth)acrylate. These (B) (meth)acrylate monomers may be used singly, or two or more thereof may be used in combination.

In the present invention, the ratio of (A) urethane (meth)acrylate oligomer with respect to the total amount of the (A) urethane (meth)acrylate oligomer and the (B) (meth)acrylate monomer is preferably 50% by mass or higher, and more preferably, from 60 to 90% by mass. When the content of the (A) urethane (meth)acrylate oligomer is less than 50% by mass, the percentage of monomer is increased, which increases a low-molecular polymer. As the result, the amount of acetone extract may be increased.

The photopolymerization initiator which is to be used for the elastic layer 2 has a function of initializing polymerization of the above-mentioned (A) urethane (meth)acrylate oligomer and (B) (meth)acrylate monomer by irradiation of ultraviolet ray. Examples of such a photopolymerization initiator include 4-dimethylamino benzoic acid, 4-dimethylamino benzoic acid ester, 2,2-dimethoxy-2-phenylacetophenone, acetophenone diethylketal, alkoxy acetophenone, benzyl dimethyl ketal, benzophenone and benzophenone derivatives such as 3,3-dimethyl-4-methoxy benzophenone, 4,4-dimethoxy benzophenone, and 4,4-diamino benzophenone, benzoyl benzoic acid alkyl, bis(4-dialkylaminophenyl)ketone, benzyl and benzyl derivatives such as benzyl methyl ketal, benzoine and benzoine derivatives such as benzoine isobutyl ether, benzoine isopropyl ether, 2-hydroxy-2-methylpropiophenone, 1-hydroxycyclohexyl phenyl ketone, xanthone, thioxanthone and thioxanthone derivative, fluorene, 2,4,6-trimethylbenzoyl diphenylphosphine oxide, bis(2,6-dimethoxy benzoyl)-2,4,4-trimethylpentyl phosphine oxide, bis(2,4,6-trimethylbenzoyl)-phenylphosphine oxide, 2-methyl-1-(4-(methylthio)phenyl)-2-morpholino propane-1,2-benzyl-2-dimethylamino-1-(morpholino phenyl)-butanone- 1. Specific examples thereof include IRGACURE 651, 184, 500, 2959, 127, 1800, 784, 907, 369, 379, 819, DAROCUR 1173, 4265, TPO (each manufactured by BASF Japan Ltd.). These photopolymerization initiators may be used singly, or two or more thereof may be used in combination. The compounding ratio of the photopolymerization initiator composition for forming an elastic layer is preferably in the range of from 0.2 to 5.0 parts by mass, in particular, from 0.5 to 2 parts by mass with respect to the total 100 parts by mass of the above-mentioned (A) urethane (meth)acrylate oligomer and the above-mentioned (B) (meth)acrylate monomer which constitute the UV curable resin.

The ionic conductive agent to be used for the elastic layer 2 has a function of imparting an electrical conductivity to the elastic layer. Since the ionic conductive agent is dissolved in the (A) urethane (meth)acrylate oligomer and at the same time has transparency, an ultraviolet ray reaches sufficiently inside the coating film even when a composition for forming an elastic layer is applied thickly on a shaft and the composition for forming an elastic layer can be sufficiently cured. Examples of such an ionic conductive agent include ammonium salts such as perchlorate, chlorate, hydrochloride, bromate, iodate, hydrofluoroboride, sulfate, ethyl sulfate, carboxylate, or sulfonate of tetraethylammonium, tetrabutylammonium, dodecyl trimethyl ammonium, hexadecyl trimethyl ammonium, benzyl trimethyl ammonium, or modified fatty acid dimethyl ethyl ammonium; perchlorate, chlorate, hydrochloride, bromate, iodate, hydrofluoroboride, sulfate, trifluoromethyl sulfate, or sulfonate of alkali metal or alkali earth metal such as lithium, sodium, potassium, calcium, or magnesium.

More concretely, in the present invention, by selecting an ionic conductive agent to be used for an elastic layer 2 from the viewpoint of ion mobility and resistance adjustment, a developing roller satisfying conditions relating to the above-mentioned surface potential can be obtained. Examples of a suitable ionic conductive agent include sodium perchlorate (MP-100, manufactured by Showa Chemical Industry Co., Ltd.) and acrylic monomer solution of lithium imide (Sankonol MTGA-50R, manufactured by Sanko Chemical Industry Co., Ltd.). These conductive agents may be used alone, or two or more thereof may be used in combination. The compounding ratio of the ionic conductive agent in the composition for forming an elastic layer depends on the types thereof, and is preferably in the range of from 0.1 to 5.0 parts by mass, in particular from 0.4 to 2.0 parts by mass, and further, from 0.4 to 1.2 parts by mass with respect to the total 100 parts by mass of (A) urethane (meth)acrylate oligomer and (B) (meth)acrylate monomer which constitute the UV curable resin.

To the composition for forming an elastic layer, a polymerization inhibitor may be further added in an amount from 0.001 to 0.2 parts by mass with respect to the total 100 parts by mass of (A) urethane (meth)acrylate oligomer and (B) (meth)acrylate monomer which constitute the UV curable resin. By adding a polymerization inhibitor, thermal polymerization before irradiation of ultraviolet can be prevented. Examples of such polymerization inhibitor include hydroquinone, hydroquinone monomethyl ether, p-methoxyphenol, 2,4-dimethyl-6-t-butylphenol, 2,6-di-t-butyl-p-cresol, butyl hydroxy anisole, 3-hydroxy thiophenol, $\alpha$-nitroso-$\beta$-naphtol, p-benzoquinone, and 2,5-dihydroxy-p-quinone.

To the composition for forming an elastic layer, a variety of known additives other than the above can be added as long as an expected effect of the present invention is not undermined. In the present invention, the thickness of the elastic layer 2 is suitably from 0.5 to 4 mm.

Next, the intermediate layer 3 in the roller of the present invention can be formed from a composition for forming the intermediate layer containing a UV curable resin, a photopolymerization initiator and a conductive agent. For such a UV curable resin and photopolymerization initiator, those similar to the one used for the above-mentioned elastic layer can be used but not particularly restricted.

For the conductive agent used for the intermediate layer 3, a variety of carbon blacks such as electrically conductive carbon black such as ketjen black, acetylene black; carbon black for rubber such as SAF, ISAF, HAF, FEF, GPF, SRF, FT, or MT; carbon black for ink such as oxidized carbon black; and thermally decomposed carbon black can be used. The compounding ratio of such carbon black is in the range of 1 part by mass or more, suitably from 2 to 15 parts by mass, and more suitably from 2 to 6 parts by mass with respect to the total 100 parts by mass of (A) urethane (meth)acrylate oligomer and (B) (meth)acrylate monomer which constitute the UV curable resin. In the present invention, by adding a carbon black in an amount in the above-mentioned range, the resistance value of the intermediate layer 3 is reduced to thereby obtain a desired resistance value as a whole roller and to obtain an effect of inhibiting change in the roller resistance due to environmental variation. It is noted that when the compounding ratio of the carbon black is too high, poor curing of the intermediate layer 3 may occur.

For the photopolymerization initiator used for the intermediate layer 3, those similar to the one used for the above-mentioned elastic layer 2 can be used, but not particularly restricted. Suitably, a photopolymerization initiator having an absorption coefficient at 254 nm of $2\times10^4$ ml/g·cm or higher and a photopolymerization initiator having an absorption coefficient at 365 nm of $4\times10^2$ ml/g·cm or higher are used in combination. Generally, when a layer containing carbon black is irradiated with a UV light, the UV light does not reach inside the layer and poor curing of the resin may occur. By using such plural photopolymerization initiators in combination, curing reaction is allowed to proceed by absorbing lights having a plurality of wavelengths. Even a layer containing more than a predetermined amount of carbon black as a conductive agent can efficiently absorb a light emitted from a light source thereby to surely complete the UV curing of the resin. A photopolymerization initiator having high absorption coefficient at 254 nm and a photopolymerization initiator having high absorption coefficient at 365 nm are dealt with because these wavelengths, 254 nm and 365 nm are main emission wavelengths of a common UV light source.

Examples of a photopolymerization initiator having an absorption coefficient at 254 nm of $2\times10^4$ ml/g·cm or higher include IRGACURE 651, 184, 500, 2959, 127, 1800, 784, DAROCUR 1173, 4265 (each manufactured by BASF Japan Ltd.). Examples of a photopolymerization initiator having an absorption coefficient at 365 nm of $4\times10^2$ ml/g·cm or higher include IRGACURE 907, 369, 379, 819, 1800, 784, DAROCUR 4265, TPO (each manufactured by BASF Japan Ltd.). The compounding ratios of these two types of photopolymerization initiators in the composition for forming the intermediate layer are preferably in the range of 0.2 to 5.0 parts by mass, in particular, 0.5 to 2 parts by mass with respect to the total 100 parts by mass of (A) urethane (meth)acrylate oligomer and (B) (meth)acrylate monomer which constitute the UV curable resin.

Further, to the composition for forming an intermediate layer, a variety of known additives other than the above can be added as long as an expected effect of the present invention is not undermined. In the present invention, the thickness of the intermediate layer 3 is suitably from 1 to 10 μm.

Next, the surface layer 4 in the roller of the present invention can be formed from a composition for forming a surface layer containing a UV curable resin and a photopolymerization initiator and not containing a conductive agent. For such a UV curable resin, those similar to the one used for the above-mentioned elastic layer can be used, and suitably those containing a urethane (meth)acrylate oligomer obtained by allowing polybutadiene polyol or hydrogenated polybutadiene polyol, polyisocyanate, and (meth)acrylate having a hydroxyl group to react are used. In other words, a UV curable resin in which a urethane (meth)acrylate oligomer using polybutadiene polyol or hydrogenated polybutadiene polyol as a polyol is used for the above-mentioned (A) urethane (meth)acrylate oligomer is suitable. By this, in the surface layer 4, a high resistance value, or high insulation properties can be obtained, and at the same time, a high surface potential can be maintained. Accordingly, in the developing roller, electrification properties of the toner is maintained, and the printing quality, in particular, the one-dot level fine line printing quality can be improved without the occurrence of durable printing fog or the like.

For the polybutadiene polyol or the hydrogenated polybutadiene polyol to be used for the above-mentioned surface layer 4, those having a weight-average molecular weight of 1200 to 20000 are preferred. When the weight-average molecular weight is too small, the hardened film is likely to break, which causes surface layer scraping. On the other hand, in order to increase the weight-average molecular weight, the polyol/isocyanate ratio needs to be increased, and the compatibility of hydrophobic polybutadiene polyol and hydrophilic isocyanate deteriorates, which increases unreacted components. This causes adherence of toner, which adversely affect the printing quality. For this reason, it is not preferable that the weight-average molecular weight is out of the above-mentioned range.

For the photopolymerization initiator to be used for the surface layer 4, those similar to the one used for the above-mentioned elastic layer 2 can be used, but not particularly restricted. The compounding ratio thereof can also be appropriately selected in a range similar to the case of the elastic layer 2. Further, to the composition for forming a surface layer, a variety of known additives other than the above can be added as long as an expected effect of the present invention is undermined. In the present invention, the thickness of the surface layer 4 is suitably from 1 to 20 µm.

The shaft 1 used for the developing roller of the present invention is not particularly restricted as long as it has a good electrical conductivity, and any of a metal shaft, a metal shaft on the outer periphery of which a highly rigid resin base is arranged, those constituted only by a highly rigid resin base, a metal or highly rigid resin cylinder the inside of which is hollowed out may be used.

Examples of the material of the above-mentioned metal shaft or metal cylinder include iron, stainless steel, aluminum. Examples of the above-mentioned highly rigid resin include polyacetal, polyamide 6, polyamide 6.6, polyamide 12, polyamide 4.6, polyamide 6.10, polyamide 6.12, polyamide 11, polyamide MXD6, polybutylene terephthalate, polyphenylene oxide, polyphenylene sulfide, polyether sulfone, polycarbonate, polyimide, polyamide-imide, polyether-imide, polysulfone, polyetheretherketone, polyethylene terephthalate, polyarylate, liquid crystal polymer, polytetrafluoroethylene, polypropylene, acrylonitrile butadiene styrene (ABS) resin, polystyrene, polyethylene, melamine resin, phenol resin, and silicone resin. Thereamong, polyacetal, polyamide 6.6, polyamide MXD6, polyamide 6.12, polybutylene terephthalate, polyphenylene ether, polyphenylene sulfide, and polycarbonate are suitable. These highly rigid resins may be used singly, or two or more thereof may be used in combination.

When a highly rigid resin is used for the shaft 1, it is preferable that a conductive agent be added and dispersed in the highly rigid resin to sufficiently secure the electrical conductivity. For the conductive agent to be dispersed in the highly rigid resin, metal powders such as carbon black powder, graphite powder, carbon fiber, aluminum, copper, and nickel; metal oxide powders such as tin oxide, titanium oxide, and zinc oxide; and powdery conductive agents such as electrically conductive glass powder are preferable. These conductive agent may be used singly, or two or more thereof may be used in combination. The compounding ratio of the conductive agent is not particularly restricted, and preferably in the range of from 5 to 40% by mass, and more preferably from 5 to 20% by mass with respect to the total highly rigid resin composition.

The external diameter of the shaft 1 is preferably in the range of from 5 to 20 mm, in particular, from 5 to 10 mm. When a resin material is used for the shaft 1, there is an advantage that even when the external diameter of the shaft 1 is increased, increase in the mass of the shaft 1 can be inhibited.

In the developing roller of the present invention, the resistance value under conditions at a temperature of 10° C. and at a humidity of 15% RH is preferably $10^4$ to $10^8 \Omega$, in particular, $10^5$ to $10^8 \Omega$ and further, $10^5$ to $10^7 \Omega$. By this, the printed image quality under low-temperature and low-humidity environment can be made favorable.

The developing roller of the present invention can be manufactured by suitably, using the above-mentioned composition for forming the elastic layer, the composition for forming the intermediate layer and the composition for forming the surface layer and by forming successively on the outer periphery of the shaft 1 the elastic layer 2, the intermediate layer 3, and the surface layer 4. Concretely, first, the above-mentioned composition for forming the elastic layer is applied on the outer periphery of the shaft 1, and then it is irradiated with a UV light to cure, thereby forming the elastic layer 2. Next, on the outer periphery of the formed elastic layer 2, the above-mentioned composition for forming the intermediate layer is applied and then it is irradiated with a UV light to form the intermediate layer 3. Further, the above-mentioned composition for forming the surface layer is applied on the outer periphery of the formed intermediate layer 3, and then it is irradiated with a UV light to cure to form the surface layer 4, whereby a suitable developing roller of the present invention can be obtained. Since in the developing roller of the present invention, the elastic layer 2 or, in particular, whole layers further composed of the intermediate layer 3 and the surface layer 4 can be formed by using a UV curable resin, a large amount of thermal energy is not needed for manufacturing thereof and the manufacturing of the roller can be performed in a short time. Since curing furnace or the like for the formation of each layer is not needed, a large amount of equipment cost is not needed.

In the present invention, examples of a method of applying a composition for forming each layer on the outer periphery of a shaft or the like include a spraying method, a roll coater method, a dipping method, a die coating method. Theramong, a die coating method is preferable. By employing a die coating method, each layer can be quickly and surely applied with the composition, thereby considerably improving the work efficiency during manufacturing of the roller.

In the present invention, the UV light source used for curing each layer is not particularly restricted, and examples thereof include a mercury lamp, a high pressure mercury lamp, an ultrahigh pressure mercury lamp, a metal halide lamp, and a xenon lamp. In particular, for the UV light source used for curing the intermediate layer, electrodeless UV lamp manufactured by Heraeus Noblelight Fusion UV Inc. is suitable since it has emission wavelengths centering at 254 nm or 365 nm and the amount of light is large. Thereamong, H bulb or D bulb can be suitably used. When a common mercury filled UV lamp is used, since a low pressure mercury lamp only has an emission wavelength of as short as about 254 nm, the lamp is not suited for curing the intermediate layer. Accordingly, for curing the intermediate layer, a high pressure mercury lamp having a long emission wavelength of about 365 nm is preferably used. Irradiation conditions such as the irradiation intensity and the integral light intensity at the time of UV light irradiation can be appropriately selected depending on the components contained in the composition for forming each layer, the composition, the application amount, or the like, but are not particularly restricted.

Third Embodiment

The third embodiment of the present invention will now be described.

FIG. 1 illustrates a longitudinal sectional view relating to one example of the developing roller of the present invention. As illustrated, a developing roller 10 of the present invention at least comprises an elastic layer 2 on the periphery of a shaft 1, and suitably an intermediate layer 3 and a surface layer 4 are further successively laminated thereon.

In the present invention, it is important that the intermediate layer 3 contain a ultraviolet (UV) curable resin, carbon black, a photopolymerization initiator having an absorption coefficient at 254 nm of $2\times10^4$ ml/g·cm or higher and a photopolymerization initiator having an absorption coefficient at 365 nm of $4\times10^2$ ml/g·cm or higher. When the intermediate layer 3 using a UV curable resin contains a plurality of photopolymerization initiators in each of which a light absorbed by the photopolymerization initiator has a different wavelength, curing reaction is allowed to proceed by absorbing lights having a plurality of wavelengths. Even a layer containing more than a predetermined amount of carbon black as a conductive agent can efficiently absorb a light emitted from a light source thereby to surely complete the UV curing of the resin. By this, it becomes possible to use carbon black as a conductive agent of the intermediate layer 3, whereby, as the resistance value of the roller under low-temperature and low-humidity environment, a low resistance value of about $10^4$ to $10^8 \Omega$ can be achieved which can not obtained only by an ionic conductive agent. Since it becomes possible to use carbon black, increase in the resistance at low humidity which is characteristic in case where an ionic conductive agent is used is hardly observed, and an issue of deterioration of printing quality due to environmental variation can be resolved.

In the present invention, a photopolymerization initiator having high absorption coefficient at 254 nm and a photopolymerization initiator having high absorption coefficient at 365 nm are dealt with because these wavelengths, 254 nm and 365 nm are main emission wavelengths of a common UV light source. A photopolymerization initiator having an absorption coefficient at 254 nm of $2\times10^4$ ml/g·cm or higher and a photopolymerization initiator having an absorption coefficient at 365 nm of $4\times10^2$ ml/g·cm or higher are individually used because if the absorption coefficient is lower than these, the occurrence of poor curing can not sufficiently be prevented. Examples of a photopolymerization initiator having an absorption coefficient at 254 nm of $2\times10^4$ ml/g·cm or higher include IRGACURE 651, 184, 500, 2959, 127, 1800, 784, DAROCUR 1173, 4265 (each manufactured by BASF Japan Ltd.). Examples of a photopolymerization initiator having an absorption coefficient at 365 nm of $4\times10^2$ ml/g·cm or higher include IRGACURE 907, 369, 379, 819, 1800, 784, DAROCUR 4265, TPO (each manufactured by BASF Japan Ltd.).

The compounding ratios of these two types of photopolymerization initiators in the composition for forming the intermediate layer are preferably in the range of 0.2 to 5.0 parts by mass, in particular, 0.5 to 2 parts by mass with respect to 100 parts by mass of the UV curable resin.

The UV curable resin to be used for the intermediate layer 3 in the present invention, is not particularly restricted for example, those containing (A) a urethane (meth)acrylate oligomer and (B) a (meth)acrylate monomer can be suitably used.

The above-mentioned (A) urethane (meth)acrylate oligomer is a compound which includes one or more of an acryloyloxy group(s) ($CH_2$=CHCOO—) or a methacryloyloxy group(s) ($CH_2$=C($CH_3$)COO—) and a plurality of urethane bonds (—NHCOO—). The number of functional groups of (A) the urethane (meth)acrylate oligomer is preferably 3.0 or less, in particular, 1.5 to 2.5. Herein, the term "functional group" refers to an acryloyloxy group and a methacryloyloxy group; the term "the number of functional groups" refers to the average number of functional groups. Since when the number of functional groups of the (A) urethane (meth)acrylate oligomer is 3.0 or less, the crosslink density in the UV curable resin is appropriately increased, the amount of acetone extract can be reduced without increasing the hardness of the layer, thereby obtaining an effect of improving staining properties against neighboring members such as a photoreceptor. When the (A) urethane (meth)acrylate oligomer contains a trifunctional urethane (meth)acrylate oligomer, the hardness of the layer may be increased.

The (A) urethane (meth)acrylate oligomer preferably has a number average molecular weight of 5,000 to 100,000 based on polystyrene. When the molecular weight of the (A) urethane (meth)acrylate oligomer is smaller than 5,000, the hardness of the layer may become too high. On the other hand, when the molecular weight of the (A) urethane (meth)acrylate oligomer is higher than 100,000, the compression set of the layer may become too high.

As the above-mentioned (A) urethane (meth)acrylate oligomer, for example, those manufactured by synthesizing a urethane prepolymer from the above-mentioned polybutadiene-based polyol and a polyisocyanate, and then adding (meth)acrylate having a hydroxyl group to the thus obtained urethane prepolymer can suitably used, but are not particularly restricted thereto.

Polyol to be used for the synthesis of the above-mentioned urethane prepolymer is a compound which include a plurality of hydroxyl groups (OH group). Specific example of such a polyol include polyether polyol, polyester polyol, polytetramethylene glycol, polybutadiene polyol, alkylene oxide-modified polybutadiene polyol and polyisoprene polyol. Thereamong, polyether polyol is particularly preferable. Specific examples of polyether polyol suitably include polyoxypropylene glycol, polyoxyethylene glycol, polyoxymethylene glycol, polyoxytetramethylene glycol, polyoxybutylene glycol. By selecting these suitable polyether polyols as the polyol used for the synthesis of the above-mentioned urethane prepolymer, the hydrophobicity of the layer is increased to obtain an effect of making it hard for the layer to uptake water. Consequently, the layer exhibits resistance to deteriorative reaction such as hydrolysis, and the amount of acetone extract can be reduced. As the result, an effect of improving staining properties against neighboring members such as a photoreceptor can be obtained. The above-mentioned polyether polyol is obtained by, for example, adding an alkylene oxide such as ethylene oxide propylene oxide to a polyhydric alcohol such as ethylene glycol, propylene glycol, and glycerin. These polyols may be used singly, or two or more thereof may be used in blend.

Polyol to be used for the synthesis of the above-mentioned urethane prepolymer preferably has a molecular weight in the range of from 500 to 15,000. When the molecular weight of polyol used for the synthesis of urethane prepolymer is smaller than 500, the hardness of the layer is increased, which is not appropriate for the layer of the developing roller. On the other hand, when the molecular weight is higher than 15,000, the compression set is increased and image defect is likely to occur.

The polyisocyanate used for the synthesis of the above-mentioned urethane prepolymer is a compound having a plurality of isocyanate groups (NCO group). Specific examples of such a polyisocyanate include tolylene diisocyanate (TDI), diphenylmethane diisocyanate (MDI), crude diphenylmethane diisocyanate (crude MDI), isophorone diisocyanate (IPDI), hydrogenated diphenylmethane diisocyanate, hydrogenated tolylene diisocyanate, hexamethylene diisocyanate (HDI) and modified isocyanurates, modified carbodiimides, and modified glycols thereof. These polyisocyanates may be used singly, or two or more thereof may be used in blend.

In the synthesis of the above-mentioned urethane prepolymer, the ratio of polyol and polyisocyanate can be appropriately selected depending on applications. Here, the above-mentioned urethane prepolymer preferably has an isocyanate index of in the range of from 110 to 200, more preferably in the range of from 115 to 200. The term "isocyanate index" represents a value calculated using (B/A)×100, where the number of OH groups of the polyol is A and the number of NCO groups of the polyisocyanate is B. When the isocyanate index of a urethane prepolymer is less than 110, the compression set is increased and image defect is likely to occur. On the other hand, when the isocyanate index is higher than 200, isocyanate which is not reacted with polyol increases and the physical properties thereof deteriorates.

In the synthesis of the above-mentioned urethane prepolymer, a catalyst for urethanation reaction is preferable used. Examples of such a catalyst for urethanation reaction include an organic tin compound such as dibutyltin dilaurate, dibutyltin diacetate, dibutyltin thiocarboxylate, dibutyltin dimaleate, dioctyltin thiocarboxylate, tin octenoate, and monobutyltin oxide; an inorganic tin compound such as stannous chloride; an organic lead compound such as lead octenoate; monoamines such as triethyl amine and dimethylcyclohexylamine; diamines such as tetramethylethylenediamine, tetramethylpropanediamine, and tetramethylhexanediamine; triamines such as pentamethyldiethylenetriamine, pentamethyldipropylenetriamine, and tetramethylguanidine; cyclic amines such as triethylenediamine, dimethylpiperazine, methylethylpiperazine, methylmorpholine, dimethylaminoethylmorpholine, dimethylimidazole, and pyridine; alcohol amines such as dimethylaminoethanol, dimethylaminoethoxyethanol, trimethylaminoethyl ethanolamine, methyl hydroxyethyl piperazine, and hydroxyethyl morpholine; ether amines such as bis(dimethylaminoethyl)ether, and ethylene glycol bis(dimethyl) aminopropyl ether; organic sulfonic acids such as p-toluene sulfonic acid, methane sulfonic acid, and fluorosulfuric acid; inorganic acids such as sulfuric acid, phosphoric acid, and perchloric acid; bases such as sodium alcoholate, lithium hydroxide, aluminum alcoholate, and sodium hydroxide; titanium compounds such as tetrabutyl titanate, tetraethyl titanate, and tetraisopropyl titanate; bismuth compounds; and quaternary ammonium salts. Among these catalysts, organic tin compounds are preferred. These catalysts may be used singly, or two or more thereof may be used in combination. The amount of the above-mentioned catalyst to be used is preferably in the range of from 0.001 to 2.0 parts by mass with respect to 100 parts by mass of the above-mentioned polyol.

(Meth)acrylate having a hydroxyl group which is to be added to the above-mentioned urethane prepolymer is a compound having one or more hydroxyl group(s) and one or more acryloyloxy group(s) ($CH_2$=CHCOO—) or methacryloyloxy group(s) ($CH_2$=C($CH_3$)COO—). Such (meth)acrylate having a hydroxyl group can be added to an isocyanate group of the above-mentioned urethane prepolymer. Examples of such (meth)acrylate having a hydroxyl group include 2-hydroxyethyl (meth)acrylate and 2-hydroxypropyl (meth)acrylate. These acrylates having a hydroxyl group may be used singly, or two or more thereof may be used in combination.

The above-mentioned (B) (meth)acrylate monomer is a monomer having one or more acryloyloxy group(s) ($CH_2$=CHCOO—) or methacryloyloxy group(s) ($CH_2$=C($CH_3$)COO—). The (B) (meth)acrylate monomer functions as a reactive diluent, in other words, is cured by UV and, at the same time, is capable of decreasing the viscosity of the composition for forming the intermediate layer.

The number of functional groups of the above-mentioned (B) (meth)acrylate monomer is preferably 3.0 or less, and more preferably from 1 to 2. Here, the term "functional group" refers to an acryloyloxy group and a methacryloyloxy group; the term "the number of functional groups" refers to the average number of functional groups. Since when the number of functional groups of (B) (meth)acrylate monomer is less than 3.0, the crosslink density in UV curable resin is appropriately increased, the amount of acetone extract can be reduced without increasing the hardness of the layer, thereby obtaining an effect of improving staining properties against neighboring members such as a photoreceptor. When the above-mentioned (B) (meth)acrylate monomer include a bifunctional (meth)acrylate monomer, the content of bifunctional (meth)acrylate monomer in the total of the above-mentioned urethane (meth)acrylate oligomer (A) and the (meth)acrylate monomer (B) is preferably from 1 to 15 mass. When the content of the bifunctional (meth)acrylate monomer is less than 1% by mass, the crosslink density in UV curable resin can not be sufficiently increased. On the other hand, when the content of the bifunctional (meth)acrylate monomer is more than 15% by mass, the crosslink density becomes too high, which may increase the hardness of the layer.

The above-mentioned (B) (meth)acrylate monomer preferably has a glass-transition temperature (Tg) of lower than 50° C. Here, the (B) (meth)acrylate monomer having a glass-transition temperature (Tg) of 50° C. or lower, generally have a characteristic that a portion in the monomer molecule excluding the above-mentioned functional group accounts for much. When the (B) (meth)acrylate monomer and the (A) urethane (meth)acrylate oligomer are polymerized, motion of a portion of the (B) (meth)acrylate monomer excluding the functional group in the polymer becomes large, and as the result, the hardness of the layer is reduced.

Examples of the above-mentioned (B) (meth)acrylate monomer include lauryl (meth)acrylate, isomyristyl (meth)acrylate, methoxy triethylene glycol (meth)acrylate, triethylene glycol di(meth)acrylate, β-(meth)acryloyloxyethyl hydrogen succinate, isobornyl (meth)acrylate, ethyl (meth)

acrylate, isobutyl (meth)acrylate, n-butyl (meth)acrylate, isoamyl (meth)acrylate, glycidyl (meth)acrylate, butoxy ethyl (meth)acrylate, ethoxy diethylene glycol (meth)acrylate, methoxy dipropylene glycol (meth)acrylate, phenoxy ethyl (meth)acrylate, 2-hydroxyethyl (meth)acrylate, and 2-hydroxypropyl (meth)acrylate. These (B) (meth)acrylate monomers may be used singly, or two or more thereof may be used in combination.

In the present invention, the ratio of (A) urethane (meth)acrylate oligomer with respect to the total amount of the (A) urethane (meth)acrylate oligomer and the (B) (meth)acrylate monomer is preferably 50% by mass or higher, and more preferably, from 60 to 90% by mass. When the content of the (A) urethane (meth)acrylate oligomer is less than 50% by mass, the percentage of monomer is increased, which increases a low-molecular polymer. As the result, the amount of acetone extract may be increased.

Examples of the carbon black used for the intermediate layer 3 include electrically conductive carbon black such as ketjen black, acetylene black; carbon black for rubber such as SAF, ISAF, HAF, FEF, GPF, SRF, FT, or MT; carbon black for ink such as oxidized carbon black; and thermally decomposed carbon black. The compounding ratio of such carbon black is in the range of essentially 1 part by mass or more, suitably from 2 to 15 parts by mass, and more suitably from 2 to 6 parts by mass with respect to the total 100 parts by mass of (A) urethane (meth)acrylate oligomer and (B) (meth)acrylate monomer which constitute the UV curable resin. In the present invention, by adding a carbon black in an amount in the above-mentioned range, the resistance value of the intermediate layer 3 is reduced to thereby obtain a desired resistance value as a whole roller and to obtain an effect of inhibiting change in the roller resistance due to environmental variation. It is noted that when the compounding ratio of the carbon black is too high, poor curing of the intermediate layer 3 may occur.

To the composition for forming an intermediate layer, a polymerization inhibitor may be further added in an amount from 0.001 to 0.2 parts by mass with respect to the total 100 parts by mass of (A) urethane (meth)acrylate oligomer and (B) (meth)acrylate monomer which constitute the UV curable resin. By adding a polymerization inhibitor, thermal polymerization before irradiation of ultraviolet can be prevented. Examples of such polymerization inhibitor include hydroquinone, hydroquinone monomethyl ether, p-methoxyphenol, 2,4-dimethyl-6-t-butylphenol, 2,6-di-t-butyl-p-cresol, butyl hydroxy anisole, 3-hydroxy thiophenol, α-nitroso-β-naphtol, p-benzoquinone, and 2,5-dihydroxy-p-quinone.

To the composition for forming an intermediate layer, a variety of known additives other than the above can further be added as long as an expected effect of the present invention is not undermined. In the present invention, the thickness of the intermediate layer 3 is suitably from 1 to 10 μm.

Next, the elastic layer 2 in the roller of the present invention can be formed from a composition for forming the elastic layer containing a UV curable resin, a photopolymerization initiator and an ionic conductive agent. For such a UV curable resin and photopolymerization initiator, those similar to the one used for the above-mentioned elastic layer can be used but not particularly restricted.

The photopolymerization initiator which is to be used for the elastic layer 2 has a function of initializing polymerization of the above-mentioned (A) urethane (meth)acrylate oligomer and (B) (meth)acrylate monomer by irradiation of ultraviolet ray. Examples of such a photopolymerization initiator include 4-dimethylamino benzoic acid, 4-dimethylamino benzoic acid ester, 2,2-dimethoxy-2-phenylacetophenone, acetophenone diethylketal, alkoxy acetophenone, benzyl dimethyl ketal, benzophenone and benzophenone derivatives such as 3,3-dimethyl-4-methoxy benzophenone, 4,4-dimethoxy benzophenone, and 4,4-diamino benzophenone, benzoyl benzoic acid alkyl, bis(4-dialkylaminophenyl)ketone, benzyl and benzyl derivatives such as benzyl methyl ketal, benzoine and benzoine derivatives such as benzoine isobutyl ether, benzoine isopropyl ether, 2-hydroxy-2-methylpropiophenone, 1-hydroxycyclohexyl phenyl ketone, xanthone, thioxanthone and thioxanthone derivative, fluorene, 2,4,6-trimethylbenzoyl diphenylphosphine oxide, bis(2,6-dimethoxy benzoyl)-2,4,4-trimethylpentyl phosphine oxide, bis(2,4,6-trimethylbenzoyl)-phenylphosphine oxide, 2-methyl-1-(4-(methylthio)phenyl)-2-morpholino propane-1,2-benzyl-2-dimethylamino-1-(morpholino phenyl)-butanone-1. Specific examples thereof include IRGACURE 651, 184, 500, 2959, 127, 1800, 784, 907, 369, 379, 819, DAROCUR 1173, 4265, TPO (each manufactured by BASF Japan Ltd.). These photopolymerization initiators may be used singly, or two or more thereof may be used in combination. The compounding ratio of the photopolymerization initiator composition for forming an elastic layer is preferably in the range of from 0.2 to 5.0 parts by mass, in particular, from 0.5 to 2 parts by mass with respect to the total 100 parts by mass of the above-mentioned (A) urethane (meth)acrylate oligomer and the above-mentioned (B) (meth)acrylate monomer which constitute the UV curable resin.

The ionic conductive agent to be used for the elastic layer 2 has a function of imparting an electrical conductivity to the elastic layer. Since the ionic conductive agent is dissolved in the (A) urethane (meth)acrylate oligomer and at the same time has transparency, an ultraviolet ray reaches sufficiently inside the coating film even when a composition for forming an elastic layer is applied thickly on a shaft and the composition for forming an elastic layer can be sufficiently cured. Examples of such an ionic conductive agent include ammonium salts such as perchlorate, chlorate, hydrochloride, bromate, iodate, hydrofluoroboride, sulfate, ethyl sulfate, carboxylate, or sulfonate of tetraethylammonium, tetrabutylammonium, dodecyl trimethyl ammonium, hexadecyl trimethyl ammonium, benzyl trimethyl ammonium, or modified fatty acid dimethyl ethyl ammonium; perchlorate, chlorate, hydrochloride, bromate, iodate, hydrofluoroboride, sulfate, trifluoromethyl sulfate, or sulfonate of alkali metal or alkali earth metal such as lithium, sodium, potassium, calcium, or magnesium.

Thereamong, examples of a suitable ionic conductive agent include sodium perchlorate (MP-100, manufactured by Showa Chemical Industry Co., Ltd.) and acrylic monomer solution of lithium imide (Sankonol MTGA-50R, manufactured by Sanko Chemical Industry Co., Ltd.). These conductive agents may be used alone, or two or more thereof may be used in combination. The compounding ratio of the ionic conductive agent in the composition for forming an elastic layer depends on the types thereof, and is preferably in the range of from 0.1 to 5.0 parts by mass, in particular from 0.4 to 2.0 parts by mass, and further, from 0.4 to 1.2 parts by mass with respect to the total 100 parts by mass of (A) urethane (meth)acrylate oligomer and (B) (meth)acrylate monomer which constitute the UV curable resin.

To the composition for forming an elastic layer, a variety of known additives other than the above can be added as long as an expected effect of the present invention is not undermined. In the present invention, the thickness of the elastic layer 2 is suitably from 0.5 to 4 mm.

Next, the surface layer 4 in the roller of the present invention can be formed from a composition for forming a surface layer containing a UV curable resin and a photopolymerization initiator and not containing a conductive agent. For such a UV curable resin, those similar to the one used for the above-mentioned elastic layer can be used, and suitably, those containing a urethane (meth)acrylate oligomer obtained by allowing polybutadiene polyol or hydrogenated polybutadiene polyol, polyisocyanate, and (meth)acrylate having a hydroxyl group to react are used. In other words, a UV curable resin in which a urethane (meth)acrylate oligomer using polybutadiene polyol or hydrogenated polybutadiene polyol as a polyol is used for the above-mentioned (A) urethane (meth)acrylate oligomer is suitable. By this, in the surface layer 4, a high resistance value, or high insulation properties can be obtained, and at the same time, a high surface potential can be maintained. Accordingly, in the developing roller, electrification properties of the toner is maintained, and the printing quality, in particular, the one-dot level fine line printing quality can be improved without the occurrence of durable printing fog or the like.

For the polybutadiene polyol or the hydrogenated polybutadiene polyol to be used for the above-mentioned surface layer 4, those having a weight-average molecular weight of 1200 to 20000 are preferred. When the weight-average molecular weight is too small, the hardened film is likely to break, which causes surface layer scraping. On the other hand, in order to increase the weight-average molecular weight, the polyol/isocyanate ratio needs to be increased, and the compatibility of hydrophobic polybutadiene polyol and hydrophilic isocyanate deteriorates, which increases unreacted components. This causes adherence of toner, which adversely affect the printing quality. For this reason, it is not preferable that the weight-average molecular weight is out of the above-mentioned range.

For the photopolymerization initiator to be used for the surface layer 4, those similar to the one used for the above-mentioned elastic layer 2 can be used, but not particularly restricted. The compounding ratio thereof can also be appropriately selected in a range similar to the case of the elastic layer 2. Further, to the composition for forming a surface layer, a variety of known additives other than the above can be added as long as an expected effect of the present invention is undermined. In the present invention, the thickness of the surface layer 4 is suitably from 1 to 20 μm.

The shaft 1 used for the developing roller of the present invention is not particularly restricted as long as it has a good electrical conductivity, and any of a metal shaft, a metal shaft on the outer periphery of which a highly rigid resin base is arranged, those constituted only by a highly rigid resin base, a metal or highly rigid resin cylinder the inside of which is hollowed out may be used.

Examples of the material of the above-mentioned metal shaft or metal cylinder include iron, stainless steel, aluminum. Examples of the above-mentioned highly rigid resin include polyacetal, polyamide 6, polyamide 6.6, polyamide 12, polyamide 4.6, polyamide 6.10, polyamide 6.12, polyamide 11, polyamide MXD6, polybutylene terephthalate, polyphenylene oxide, polyphenylene sulfide, polyether sulfone, polycarbonate, polyimide, polyamide-imide, polyether-imide, polysulfone, polyetheretherketone, polyethylene terephthalate, polyarylate, liquid crystal polymer, polytetrafluoroethylene, polypropylene, acrylonitrile butadiene styrene (ABS) resin, polystyrene, polyethylene, melamine resin, phenol resin, and silicone resin. Thereamong, polyacetal, polyamide 6.6, polyamide MXD6, polyamide 6.12, polybutylene terephthalate, polyphenylene ether, polyphenylene sulfide, and polycarbonate are suitable. These highly rigid resins may be used singly, or two or more thereof may be used in combination.

When a highly rigid resin is used for the shaft 1, it is preferable that a conductive agent be added and dispersed in the highly rigid resin to sufficiently secure the electrical conductivity. For the conductive agent to be dispersed in the highly rigid resin, metal powders such as carbon black powder, graphite powder, carbon fiber, aluminum, copper, and nickel; metal oxide powders such as tin oxide, titanium oxide, and zinc oxide; and powdery conductive agents such as electrically conductive glass powder are preferable. These conductive agent may be used singly, or two or more thereof may be used in combination. The compounding ratio of the conductive agent is not particularly restricted, and preferably in the range of from 5 to 40% by mass, and more preferably from 5 to 20% by mass with respect to the total highly rigid resin composition.

The external diameter of the shaft 1 is preferably in the range of from 5 to 20 mm, in particular, from 5 to 10 mm. When a resin material is used for the shaft 1, there is an advantage that even when the external diameter of the shaft 1 is increased, increase in the mass of the shaft 1 can be inhibited.

In the developing roller of the present invention, the resistance value under conditions at a temperature of 10° C. and at a humidity of 15% RH is preferably $10^4$ to $10^8 \Omega$, in particular, $10^5$ to $10^8 \Omega$ and further, $10^5$ to $10^7 \Omega$. By this, the printed image quality under low-temperature and low-humidity environment can be made favorable.

The developing roller of the present invention can be manufactured by suitably, using the above-mentioned composition for forming the elastic layer, the composition for forming the intermediate layer and the composition for forming the surface layer and by forming successively on the outer periphery of the shaft 1 the elastic layer 2, the intermediate layer 3, and the surface layer 4. Concretely, first, the above-mentioned composition for forming the elastic layer is applied on the outer periphery of the shaft 1, and then it is irradiated with a UV light to cure, thereby forming the elastic layer 2. Next, on the outer periphery of the formed elastic layer 2, the above-mentioned composition for forming the intermediate layer is applied and then it is irradiated with a UV light to form the intermediate layer 3. Further, the above-mentioned composition for forming the surface layer is applied on the outer periphery of the formed intermediate layer 3, and then it is irradiated with a UV light to cure to form the surface layer 4, whereby a suitable developing roller of the present invention can be obtained. Since in the developing roller of the present invention, the elastic layer 2 or, in particular, whole layers further composed of the intermediate layer 3 and the surface layer 4 can be formed by using a UV curable resin, a large amount of thermal energy is not needed for manufacturing thereof and the manufacturing of the roller can be performed in a short time. Since curing furnace or the like for the formation of each layer is not needed, a large amount of equipment cost is not needed.

In the present invention, examples of a method of applying a composition for forming each layer on the outer periphery of a shaft or the like include a spraying method, a roll coater method, a dipping method, a die coating method. Thereamong, a die coating method is preferable. By employing a die coating method, each layer can be quickly and surely applied with the composition, thereby considerably improving the work efficiency during manufacturing of the roller.

In the present invention, the UV light source used for curing each layer is not particularly restricted, and examples thereof include a mercury lamp, a high pressure mercury lamp, an ultrahigh pressure mercury lamp, a metal halide lamp, and a xenon lamp. In particular, for the UV light source used for curing the intermediate layer, electrodeless UV lamp manufactured by Heraeus Noblelight Fusion UV Inc. is suitable since it has emission wavelengths centering at 254 nm or 365 nm and the amount of light is large. Thereamong, H bulb or D bulb can be suitably used. When a common mercury filled UV lamp is used, since a low pressure mercury lamp only has an emission wavelength of as short as about 254 nm, the lamp is not suited for curing the intermediate layer. Accordingly, for curing the intermediate layer, a high pressure mercury lamp having a long emission wavelength of about 365 nm is preferably used. Irradiation conditions such as the irradiation intensity and the integral light intensity at the time of UV light irradiation can be appropriately selected depending on the components contained in the composition for forming each layer, the composition, the application amount, or the like, but are not particularly restricted.

EXAMPLES

The present invention will now be described in detail by way of Examples.

Example 1

Materials for an elastic layer as listed in the Table below were kneaded at 60 rpm for one hour by a planetary mixer to prepare a composition for forming an elastic layer. The obtained composition for forming an elastic layer was applied to the outer periphery of a shaft (external diameter: 13 mm, material: aluminum) by traverse coating using a roll coater. While rotating the coated shaft, the coated shaft was irradiated with a UV light by using a electrodeless UV lamp, H bulb, manufactured by Heraeus Noblelight Fusion UV Inc. for five seconds to form an elastic layer having a thickness of 1.5 mm.

TABLE 1

|  | Manufacturer | Product name | parts by mass |
|---|---|---|---|
| Urethane acrylate oligomer | manufactured by Asia Industry Co., Ltd. | NX44-31 | 80 |
| Acrylic monomer | manufactured by kyoeisha Chemical Co., Ltd. | LIGHT ESTER HOA | 20 |
| Ionic conductive agent | manufactured by Sanko Chemical Industry Co., Ltd. | Sankonol MTGA-50R | 0.5 |
| Photo initiator | manufactured by BASF Japan Ltd. | IRGACURE 184 | 0.5 |

Next, in accordance with the intermediate layer formulation as listed in the Table below, a composition for forming an intermediate layer was prepared in the same manner as above. The obtained composition for forming an intermediate layer was applied to the outer periphery of the shaft on which the elastic layer was formed by traverse coating using a roll coater. While rotating the coated shaft, the coated shaft was irradiated with a UV light by using a electrodeless UV lamp, H bulb, manufactured by Heraeus Noblelight Fusion UV Inc. for five seconds to form an intermediate layer having a thickness of 3 μm.

TABLE 2

|  | Manufacturer | Product name | parts by mass |
|---|---|---|---|
| Urethane acrylate oligomer | manufactured by Dai-ichi Kogyo Seiyaku Co., Ltd. | BT-01D | 60 |
| Acrylic monomer | manufactured by Shin-Nakamura Chemical Co., Ltd. | NK Ester AMO | 13 |
|  | manufactured by Shin-Nakamura Chemical Co., Ltd. | NK Ester ASA | 15 |
|  | manufactured by kyoeisha Chemical Co., Ltd. | LIGHT ACRYLATE 14EG-A | 8 |
|  | manufactured by Showa Denko K.K. | Karenz AOI | 5 |
| Conductive agent | manufactured by MI KUNI COLOR LTD. | trial material (ketjen black) | 4.2 |
| Photopolymerization initiator | manufactured by BASF Japan Ltd. | IRGACURE 184 (absorption coefficient at 254 nm: $3.32 \times 10^4$ ml/g·cm) | 1 |
|  | manufactured by BASF Japan Ltd. | IRGACURE 819 (absorption coefficient at 365 nm: $2.31 \times 10^3$ ml/g·cm) | 1 |

Next, in accordance with the following procedure, urethane acrylate oligomers 1 to 11 were manufactured. First, according to the Tables 3 and 4 below, polyol A and isocyanate B were precisely measured off into a three-necked flask according to the poly/iso ratios listed in Table 4. The poly/iso ratios were calculated in number of moles. While the resultant was stirred at 100 rpm, dibutyltin laurate were added thereto in an amount of 0.01% by mass based on the total weight of polyol A and isocyanate B. The resultant was heated by a heating mantle at a liquid temperature of 70° C. for two hours. Thereafter, polyol was found to disappear by a hydroxyl value method. Subsequently, 2-HEA (hydroxyethyl acrylate) was precisely measured off to drop into the above-mentioned three-necked flask. The amount of 2-HEA was calculated according to the following formula:

the number of moles of 2-HEA=(the number of moles of polyol−the number of moles of isocyanate)×2.02

The resultant was heated by a heating mantle at a liquid temperature of 70° C. for two hours. Thereafter, isocyanate was found to disappear by IR to thereby complete the reaction.

TABLE 3

| Material | Details | Product name | Manufacturer |
|---|---|---|---|
| A-1 | hydrogenated polybutadiene polyol (Mw = 1000) | GI-1000 | NIPPON SODA CO., LTD. |
| A-2 | hydrogenated polybutadiene polyol (Mw = 2000) | GI-2000 | NIPPON SODA CO., LTD. |
| A-3 | hydrogenated polybutadiene polyol (Mw = 2300) | Epol | Idemitsu Kosan Co., Ltd. |
| B-1 | IPDI (isophorone diisocyanate) | — | — |
| B-2 | TDI (2,4-toluene diisocyanate) | — | — |
| B-3 | hydrogenated HDI (methylene bis(4,1-cyclohexanediyl) bis-isocyanate) | — | — |
| B-4 | 1,6HDI (1,6-hexyl diisocyanate) | — | — |

TABLE 4

| | poly/iso ratio | B-1 | B-2 | B-3 | B-4 |
|---|---|---|---|---|---|
| A-1 | 2 | urethane acrylate oligomer 1 | | | |
| | 1.5 | urethane acrylate oligomer 2 | urethane acrylate oligomer 8 | urethane acrylate oligomer 10 | urethane acrylate oligomer 11 |
| | 1.2 | urethane acrylate oligomer 3 | urethane acrylate oligomer 9 | | |
| A-2 | 2 | urethane acrylate oligomer 4 | | | |
| | 1.5 | urethane acrylate oligomer 5 | | | |
| A-3 | 2 | urethane acrylate oligomer 6 | | | |
| | 1.5 | urethane acrylate oligomer 7 | | | |

Composition for forming a surface layer was prepared in accordance with the surface layer formulation listed on the Tables 5 to 9 below in the same manner as above. The obtained composition for forming a surface layer was applied to the outer periphery of a shaft on which an elastic layer and an intermediate layer were formed by traverse coating using a roll coater. While rotating the coated shaft, the coated shaft was irradiated with a UV light by using a electrodeless UV lamp, H bulb, manufactured by Heraeus Noblelight Fusion UV Inc. for five seconds to form a surface layer having a thickness of 2 μm, thereby obtaining individual developing rollers of Example and Comparative Example.

<Evaluation of Hardened Film>

A hardened film sample of the obtained composition for forming a surface layer used in each of Examples and Comparative Examples was manufactured. For the hardened film sample, the volume resistance value at a temperature of 23° C., a humidity of 55% RH was measured.

<Resistance Value Under Low-Temperature and Low-Humidity (LL) and High-Temperature and High-Humidity (HH) Environment>

For the obtained developing roller in each of Examples and Comparative Examples, the resistance values under a condition at a temperature of 10° C., a humidity of 15% RH (LL) and a condition at a temperature of 32.5° C., a humidity of 80% RH (HH) were measured to calculate the difference therebetween.

<Measurement of Surface Potential>

For the obtained developing roller in each of Examples and Comparative Examples, the surface potential at a temperature of 23° C., a humidity of 55% RH was measured.

<Evaluation of Printed Image Quality Under Low-Temperature and Low-Humidity (LL) and High-Temperature and High-Humidity (HH) Environment>

The obtained developing roller in each of Examples and Comparative Examples was placed in a commercially available printer (manufactured by BROTHER INDUSTRIES, LTD.; HL-2240D) under a condition at a temperature of 10° C., a humidity of 15% RH (LL) and under a condition at a temperature of 32.5° C., a humidity of 80% RH(HH); 1000 sheets were printed in 1% density to be left to stand still overnight, and then 100% density black image and one dot fine line image were printed thereon. The transmission density thereof was measured to be set as a printed image quality.

In the case of 100% density black image, when the transmission density was 1.90 or higher, the result was represented by "good"; when the transmission density was less than 1.90, the result was represented by "poor". Regarding the one dot fine line image, when the fine line was broken, the result was represented by "poor". Measurement of the transmission density was performed by using X-Rite 310T manufactured by SAKATA INX ENG. CO., LTD.

The results of the above are listed on the Tables below in combination.

TABLE 5

|  |  |  |  | Example 1-1 | Example 1-2 | Example 1-3 | Example 1-4 | Example 1-5 |
|---|---|---|---|---|---|---|---|---|
| Surface layer composition | Urethane acrylate oligomer | Hydrogenated polybutadiene-based | 1 | 68 | — | — | — | — |
|  |  |  | 2 | — | 68 | — | — | — |
|  |  |  | 3 | — | — | 68 | — | — |
|  |  |  | 4 | — | — | — | 68 | — |
|  |  |  | 5 | — | — | — | — | 68 |
|  | Acrylic monomer | Acrylic monomer A*[1-1] |  | 12 | 12 | 12 | 12 | 12 |
|  |  | Acrylic monomer B*[1-2] |  | 10 | 10 | 10 | 10 | 10 |
|  |  | Acrylic monomer C*[1-3] |  | 5 | 5 | 5 | 5 | 5 |
|  |  | Acrylic monomer D*[1-4] |  | 10 | 10 | 10 | 10 | 10 |
|  | Urethane particle*[1-5] |  |  | 30 | 30 | 30 | 30 | 30 |
|  | Photo initiator | IRGACURE 184*[1-6] |  | 1 | 1 | 1 | 1 | 1 |
| Evaluation of hardened film | Volume resistance value (LOGΩ) |  |  | 14.2 | 14.2 | 14.1 | 14.2 | 14.1 |
| Evaluation of roller | Resistance value (LOGΩ) | under LL environment |  | 6.8 | 6.9 | 6.9 | 7.0 | 6.8 |
|  |  | under HH environment |  | 5.8 | 5.8 | 5.7 | 5.9 | 6.0 |
|  |  | Difference |  | 1.0 | 1.1 | 1.2 | 1.1 | 0.8 |
|  | surface potential (V) |  |  | 1850 | 1760 | 1780 | 1780 | 1820 |
|  | Printing quality | under LL environment | 100% black printing | good | good | good | good | good |
|  |  |  | fine line printing | good | good | good | good | good |
|  |  | under HH environment | 100% black printing | good | good | good | good | good |
|  |  |  | fine line printing | good | good | good | good | good |

*[1-1]Acrylic monomer A: LIGHT ACRYLATE TMP-A (manufactured by kyoeisha Chemical Co.,Ltd.)
*[1-2]Acrylic monomer B: UV-AF201 (manufactured by The Nippon Synthetic Chemical Industry Co., Ltd.)
*[1-3]Acrylic monomer C: MEGAFACE RS-72K (manufactured by DIC Corporation)
*[1-4]Acrylic monomer D: FAAC-6 (manufactured by UNIMATEC CO., LTD. )
*[1-5]Urethane particle: DAIMICBEAZ 5050D (manufactured by Dainichiseika Color & Chemicals Mfg. Co.,Ltd.)
*[1-6]IRGACURE 184: manufactured by BASF Japan Ltd.

TABLE 6

|  |  |  |  | Example 1-6 | Example 1-7 | Example 1-8 | Example 1-9 | Example 1-10 |
|---|---|---|---|---|---|---|---|---|
| Surface layer composition | Urethane acrylate oligomer | Hydrogenated polybutadiene-based | 6 | 68 | — | — | — | — |
|  |  |  | 7 | — | 68 | — | — | — |
|  |  |  | 8 | — | — | 68 | — | — |
|  |  |  | 9 | — | — | — | 68 | — |
|  |  |  | 10 | — | — | — | — | 68 |
|  | Acrylic monomer | Acrylic monomer A*[1-1] |  | 12 | 12 | 12 | 12 | 12 |
|  |  | Acrylic monomer B*[1-2] |  | 10 | 10 | 10 | 10 | 10 |
|  |  | Acrylic monomer C*[1-3] |  | 5 | 5 | 5 | 5 | 5 |
|  |  | Acrylic monomer D*[1-4] |  | 10 | 10 | 10 | 10 | 10 |
|  | Urethane particle*[1-5] |  |  | 30 | 30 | 30 | 30 | 30 |
|  | Photo initiator | IRGACURE 184*[1-6] |  | 1 | 1 | 1 | 1 | 1 |
| Evaluation of hardened film | Volume resistance value (LOGΩ) |  |  | 14.3 | 14.5 | 14.3 | 14.2 | 14.1 |
| Evaluation of roller | Resistance value (LOGΩ) | under LL environment |  | 6.7 | 6.8 | 6.9 | 7.1 | 7.1 |
|  |  | under HH environment |  | 5.5 | 5.8 | 5.6 | 6.0 | 5.8 |
|  |  | Difference |  | 1.2 | 1.0 | 1.3 | 1.1 | 1.3 |
|  | Surface potential (V) |  |  | 1800 | 1890 | 2000 | 1950 | 2000 |
|  | Printing quality | under LL environment | 100% black printing | good | good | good | good | good |
|  |  |  | fine line printing | good | good | good | good | good |
|  |  | under HH environment | 100% black printing | good | good | good | good | good |
|  |  |  | fine line printing | good | good | good | good | good |

TABLE 7

|  |  |  |  | Example 1-11 | Example 1-12 | Example 1-13 | Example 1-14 |
|---|---|---|---|---|---|---|---|
| Surface layer composition | Urethane acrylate oligomer | Hydrogenated polybutadiene-based | 11 | 68 |  |  |  |

TABLE 7-continued

|  |  |  | Example 1-11 | Example 1-12 | Example 1-13 | Example 1-14 |
|---|---|---|---|---|---|---|
|  | Polybutadiene-based | TEAI-1000*[1-7] | — | 68 | — | — |
|  |  | TEA-1000*[1-8] | — | — | 68 | — |
|  |  | TE-2000*[1-9] | — | — | — | 68 |
| Acrylic monomer | Acrylic monomer A*[1-1] |  | 12 | 12 | 12 | 12 |
|  | Acrylic monomer B*[1-2] |  | 10 | 10 | 10 | 10 |
|  | Acrylic monomer C*[1-3] |  | 5 | 5 | 5 | 5 |
|  | Acrylic monomer D*[1-4] |  | 10 | 10 | 10 | 10 |
|  | Urethane particle*[1-5] |  | 30 | 30 | 30 | 30 |
| Photo initiator | IRGACURE 184*[1-6] |  | 1 | 1 | 1 | 1 |
| Evaluation of hardened film | Volume resistance value (LOGΩ) |  | 14.2 | 14.2 | 14.5 | 14.1 |
| Evaluation of roller | Resistance value (LOGΩ) | under LL environment | 6.5 | 6.8 | 6.8 | 6.8 |
|  |  | under HH environment | 5.5 | 5.6 | 5.6 | 5.6 |
|  |  | Difference | 1.0 | 1.2 | 1.2 | 1.2 |
|  | Surface potential (V) |  | 1650 | 1700 | 1900 | 1700 |
| Printing quality | under LL environment | 100% black printing | good | good | good | good |
|  |  | fine line printing | good | good | good | good |
|  | under HH environment | 100% black printing | good | good | good | good |
|  |  | fine line printing | good | good | good | good |

*[1-7]TEAI-1000: manufactured by NIPPON SODA CO., LTD.
*[1-8]TEA-1000: manufactured by NIPPON SODA CO., LTD.
*[1-9]TE-2000: manufactured by NIPPON SODA CO., LTD.

TABLE 8

|  |  |  |  | Comparative Example 1-1 | Comparative Example 1-2 | Comparative Example 1-3 | Comparative Example 1-4 |
|---|---|---|---|---|---|---|---|
| Surface layer composition | Urethane acrylate oligomer | Carbonate-based | PCA004*[1-10] | 68 | — | — | — |
|  |  |  | PCA005*[1-11] | — | 68 | — | — |
|  |  |  | PCA006*[1-12] | — | — | 68 | — |
|  |  | Ester-based | SUA001*[1-13] | — | — | — | 68 |
|  | Acrylic monomer | Acrylic monomer A*[1-1] |  | 12 | 12 | 12 | 12 |
|  |  | Acrylic monomer B*[1-2] |  | 10 | 10 | 10 | 10 |
|  |  | Acrylic monomer C*[1-3] |  | 5 | 5 | 5 | 5 |
|  |  | Acrylic monomer D*[1-4] |  | 10 | 10 | 10 | 10 |
|  | Urethane particle*[1-5] |  |  | 30 | 30 | 30 | 30 |
|  | Photo initiator | IRGACURE 184*[1-6] |  | 1 | 1 | 1 | 1 |
| Evaluation of hardened film | Volume resistance value (LOGΩ) |  |  | 13.5 | 13.1 | 12.8 | 11.2 |
| Evaluation of roller | Resistance value (LOGΩ) | under LL environment |  | 6.8 | 6.5 | 6.3 | 6.2 |
|  |  | under HH environment |  | 5.8 | 5.0 | 5.1 | 4.9 |
|  |  | Difference |  | 1.0 | 1.5 | 1.2 | 1.3 |
|  | Surface potential (V) |  |  | 850 | 510 | 180 | 1520 |
| Printing quality | Under LL environment | 100% black printing |  | poor | poor | good | poor |
|  |  | fine line printing |  | good | good | poor | good |
|  | under HH environment | 100% black printing |  | poor | good | good | poor |
|  |  | fine line printing |  | good | poor | poor | good |

*[1-10]PCA004: manufactured by Asia Industry Co., Ltd.
*[1-11]PCA005: manufactured by Asia Industry Co., Ltd.
*[1-12]PCA006: manufactured by Asia Industry Co., Ltd.
*[1-13]SUA001: manufactured by Asia Industry Co., Ltd.

TABLE 9

|  |  |  |  | Comparative Example 1-5 | Comparative Example 1-6 | Comparative Example 1-7 | Comparative Example 1-8 |
|---|---|---|---|---|---|---|---|
| Surface layer composition | Urethane acrylate oligomer | Ester-based | SHIKOH 3000B*[1-14] | 68 | — | — | — |
|  |  |  | SHIKOH 3200B*[1-15] | — | 68 | — | — |
|  |  | Ether-based | SHIKOH 3700B*[1-16] | — | — | 68 | — |
|  |  |  | NX44-31*[1-17] | — | — | — | 68 |
|  | Acrylic monomer | Acrylic monomer A*[1-1] |  | 12 | 12 | 12 | 12 |
|  |  | Acrylic monomer B*[1-2] |  | 10 | 10 | 10 | 10 |
|  |  | Acrylic monomer C*[1-3] |  | 5 | 5 | 5 | 5 |
|  |  | Acrylic monomer D*[1-4] |  | 10 | 10 | 10 | 10 |
|  | Urethane particle*[1-5] |  |  | 30 | 30 | 30 | 30 |
|  | Photo initiator | IRGACURE 184*[1-6] |  | 1 | 1 | 1 | 1 |
| Evaluation of hardened film | Volume resistance value (LOGΩ) |  |  | 11 | 11.8 | 10.2 | 10.1 |
| Evaluation of roller | Resistance value (LOGΩ) | under LL environment |  | 6.2 | 6.1 | 6.2 | 6.2 |
|  |  | under HH environment |  | 4.9 | 5.1 | 4.9 | 4.8 |
|  |  | Difference |  | 1.3 | 1.0 | 1.3 | 1.4 |
|  | Surface potential (V) |  |  | 100 | 130 | 55 | 43 |
| Printing quality | under LL environment | 100% black printing |  | poor | poor | poor | good |
|  |  | fine line printing |  | poor | poor | poor | poor |
|  | under HH environment | 100% black printing |  | good | good | good | good |
|  |  | fine line printing |  | poor | poor | poor | poor |

*[1-14]SHIKOH 3000B: manufactured by The Nippon Synthetic Chemical Industry Co., Ltd.
*[1-15]SHIKOH 3200B: manufactured by The Nippon Synthetic Chemical Industry Co., Ltd.
*[1-16]SHIKOH 3700B: manufactured by The Nippon Synthetic Chemical Industry Co., Ltd.
*[1-17]NX44-31: manufactured by Asia Industry Co., Ltd.

As shown in the above-mentioned Tables, in Examples 1-1 to 1-11 in which a urethane acrylate oligomer using a hydrogenated polybutadiene polyol is used, even when the poly/iso ratio, the molecular weight of polyol or the type of isocyanate was changed, an exponential value of higher than 14 is attained as the volume resistance value of the hardened film. The volume resistance value of the hardened film is correlated with the surface potential of the roller, and when a material whose volume resistance value is high is used, a high surface potential tends to be obtained. The surface potential is correlated with the fine line printing quality in the evaluation of the printing quality, and when the surface potential is 1000 V or higher, the result of the fine line printing was "good".

From the above-mentioned results, it was confirmed that the only material which satisfy the printing quality both in the 100% density black image and in the one dot fine line image is the one in the developing roller in which a polybutadiene-based urethane acrylate oligomer is used. This is because (1) the material has a high volume resistance value and suitable for a fine line printing and because (2) Fermi order of the material is lower than that of toner, which is appropriate for the mechanism of electrification. It is noted that altought the explanation based on the (2) Fermi order is described in a patent application or the like, there are many cases where the theory does not apply. This is thought to be because the surface properties or tackiness is also involved. Accordingly, the finding that the polybutadiene polyol-based urethane acrylate oligomer found by the present invention is suitable for a positively charged toner is not completely theoretically explained.

Example 2

Materials for an elastic layer as listed in each of the Tables 12 to 17 below were kneaded at 60 rpm for one hour by a planetary mixer to prepare a composition for forming an elastic layer. The obtained composition for forming an elastic layer was applied to the outer periphery of a shaft (external diameter: 13 mm, material: aluminum) by traverse coating using a roll coater. While rotating the coated shaft, the coated shaft was irradiated with a UV light by using a electrodeless UV lamp, H bulb, manufactured by Heraeus Noblelight Fusion UV Inc. for five seconds to form an elastic layer having a thickness of 1.5 mm.

Next, in accordance with the intermediate layer formulation as listed in the Table below, a composition for forming an intermediate layer was prepared in the same manner as above. The obtained composition for forming an intermediate layer was applied to the outer periphery of the shaft on which the elastic layer was formed by traverse coating using a roll coater. While rotating the coated shaft, the coated shaft was irradiated with a UV light by using a electrodeless UV lamp, H bulb, manufactured by Heraeus Noblelight Fusion UV Inc. for five seconds to form an intermediate layer having a thickness of 3 μm.

TABLE 10

|  | Manufacturer | Product name | parts by mass |
|---|---|---|---|
| Urethane acrylate oligomer | manufactured by Dai-ichi Kogyo Seiyaku Co., Ltd. | BT-01D | 60 |
| Acrylic monomer | manufactured by Shin-Nakamura Chemical Co., Ltd. | NK Ester AMO | 13 |
|  | manufactured by Shin-Nakamura Chemical Co., Ltd. | NK Ester ASA | 15 |
|  | manufactured by kyoeisha Chemical Co., Ltd. | LIGHT ACRYLATE 14EG-A | 8 |
|  | manufactured by Showa Denko K.K. | Karenz AOI | 5 |
| Conductive agent | manufactured by MIKUNI COLOR LTD. | trial material (ketjen black) | 4.2 |
| Photopolymerization initiator | manufactured by BASF Japan Ltd. | IRGACURE 184 (absorption coefficient at 254 nm $3.32 \times 10^4$ ml/g·cm) | 1 |
|  | manufactured by BASF Japan Ltd. | IRGACURE 819 (absorption coefficient at 365 nm $2.31 \times 10^3$ ml/g·cm) | 1 |

Composition for forming a surface layer was prepared in accordance with the surface layer formulation listed on the Table below in the same manner as above. The obtained composition for forming a surface layer was applied to the outer periphery of a shaft on which an elastic layer and an intermediate layer were formed by traverse coating using a roll coater. While rotating the coated shaft, the coated shaft was irradiated with a UV light by using a electrodeless UV lamp, H bulb, manufactured by Heraeus Noblelight Fusion UV Inc. for five seconds to form a surface layer having a thickness of 2 μm, thereby obtaining individual developing rollers of Example and Comparative Example.

TABLE 11

|  | Manufacturer | Product name | parts by mass |
|---|---|---|---|
| Urethane acrylate oligomer | manufactured by NIPPON SODA CO., LTD. | TEAI-1000 (obtained by reacting polybutadiene-based polyol, polyisocyanate and hydroxyl-containing acrylate) | 68 |
| Acrylic monomer | manufactured by kyoeisha Chemical Co., Ltd. | LIGHT ACRYLATE TMP-A | 12 |
|  | manufactured by The Nippon Synthetic Chemical Industry Co., Ltd. | UV-AF201 | 10 |
|  | manufactured by DIC Corporation | MEGAFACE RS-72K | 5 |
|  | manufactured by UNIMATEC CO., LTD. | FAAC-6 | 10 |
| Urethane particle | manufactured by Dainichiseika Color & Chemicals Mfg. Co., Ltd. | DAIMICBEAZ 5050D | 30 |
| Photopolymerization initiator | manufactured by BASF Japan Ltd. | IRGACURE 184 | 1 |

<Surface Potential 0.4 Seconds Thereafter Under High-Temperature and High-Humidity (HH) Environment>

Figure 3:
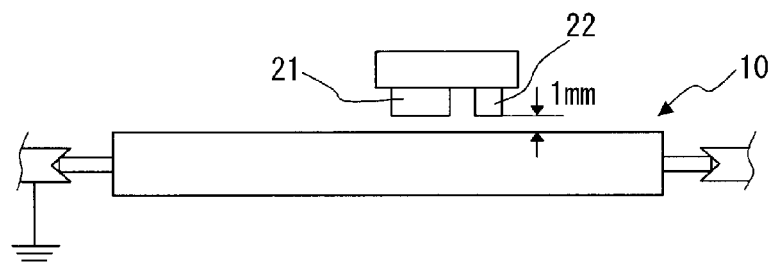
FIG. 3 is a schematic diagram illustrating an apparatus for measuring the surface potential used in Example.

For the obtained developing roller in each of Examples and Comparative Examples, by using a measuring apparatus illustrated in FIG. 3, when the surface thereof was electrified by corona discharge at 8 kV from a corona discharger 21 from a position 1 mm away from the surface under high-temperature and high-humidity conditions at a temperature of 32.5° C. and at a humidity of 80% RH, the surface potential 0.4 seconds thereafter was measured by a surface potentiometer probe 22.

<Evaluation of Printing Fog Under High-Temperature and High-Humidity (HH) Environment>

The obtained developing roller in each of Examples and Comparative Examples was placed in a commercially available printer (manufactured by BROTHER INDUSTRIES, LTD.; HL-4040CN) under high-temperature and high-humidity conditions at a temperature of 32.5° C., a humidity of 80% RH; 3000 sheets were printed in 1% density to observe whether there was fogging or not. When toner is printed on a white background portion, which can be visually observed, it was judged as poor (x).

<Resistance Value Under Low-Temperature and Low-Humidity (LL) Environment>

For the obtained developing roller of each of Examples and Comparative Examples, the resistance value under conditions at a temperature of 10° C. and at a humidity of 15% RH was measured.

<Evaluation of Printed Image Quality of Low-Temperature and Low-Humidity (LL) Environment>

The obtained developing roller in each of Examples and Comparative Examples was placed in a commercially available printer (manufactured by BROTHER INDUSTRIES, LTD.; HL-4040CN) under a low-temperature and low-humidity condition at a temperature of 10° C., a humidity of 15% RH; 1000 sheets were printed in 1% density to be left to stand still overnight, and then 100% density black image was printed thereon. The transmission density thereof was measured to be set as a printed image quality. When the transmission density was 1.85 or lower, the result was represented by "x"; when the transmission density was higher than 1.85 and lower than 1.90, the result was represented by "Δ" and when the transmission density was higher than 1.90, the result was represented by "○". Measurement of the transmission density was performed by using X-Rite 310T manufactured by SAKATA INX ENG. CO., LTD.

The results of the above are listed on the Tables below in combination.

TABLE 12

|  |  | Comparative Example 2-1 | Comparative Example 2-2 | Example 2-1 | Example 2-2 | Example 2-3 |
|---|---|---|---|---|---|---|
| Elastic layer composition | Urethane acrylate oligomer*[2-1] | 80 | 80 | 80 | 80 | 80 |
|  | Acrylic monomer*[2-2] | 20 | 20 | 20 | 20 | 20 |
| Ionic conductive agent | Acrylic monomer solution of lithium imide*[2-3] | — | 2 | 0.1 | 0.5 | 1 |
|  | Sodium perchlorate*[2-4] | — | — | — | — | — |
|  | Quaternary ammonium perchlorate*[2-5] | — | — | — | — | — |
|  | Quaternary ammonium alkyl sulfate*[2-6] | — | — | — | — | — |
|  | Borate*[2-7] | — | — | — | — | — |
|  | Quaternary ammonium ethyl sulphate*[2-8] | — | — | — | — | — |
| Photopolymerization initiator*[2-9] |  | 0.5 | 0.5 | 0.5 | 0.5 | 0.5 |
| Potential 0.4 seconds thereafter under HH environment (V) |  | 180 | 20 | 35 | 30 | 28 |
| Evaluation of printing fog under HH environment |  | ○ | x | ○ | ○ | ○ |
| Resistance value under LL environment (LogΩ) |  | 9.2 | 5.6 | 6.7 | 5.8 | 5.6 |
| Printed image quality under LL environment |  | x | ○ | ○ | ○ | ○ |

*[2-1]Urethane acrylate oligomer: NX44-31 (manufactured by Asia Industry Co., Ltd.)
*[2-2]Acrylic monomer: HOA (manufactured by kyoeisha Chemical Co., Ltd.)
*[2-3]Acrylic monomer solution of lithium imide: Sankonol MTGA-50R (manufactured by Sanko Chemical Industry Co., Ltd.)
*[2-4]Sodium perchlorate: MP-100 (manufactured by Showa Chemical Industry Co., Ltd.)
*[2-5]Quaternary ammonium perchlorate: KS555 (manufactured by Kao Corporation)
*[2-6]Quaternary ammonium alkyl sulfate: KS48 (manufactured by Kao Corporation)
*[2-7]Borate: PEL46 (manufactured by Japan Carlit Co., Ltd.)
*[2-8]Quaternary ammonium ethyl sulphate: ELEGAN 264WAX (manufactured by NOF CORPORATION)
*[2-9]Photopolymerization initiator: IRGACURE 184 (manufactured by BASF Japan Ltd.)

TABLE 13

|  |  | Example 2-4 | Example 2-5 | Example 2-6 | Example 2-7 |
|---|---|---|---|---|---|
| Elastic layer composition | Urethane acrylate oligomer*[2-1] | 80 | 80 | 80 | 80 |
|  | Acrylic monomer*[2-2] | 20 | 20 | 20 | 20 |
| Ionic conductive agent | Acrylic monomer solution of lithium imide*[2-3] | — | — | — | — |
|  | Sodium perchlorate*[2-4] | 0.1 | 0.5 | 1 | 2 |
|  | Quaternary ammonium perchlorate*[2-5] | — | — | — | — |
|  | Quaternary ammonium alkyl sulfate*[2-6] | — | — | — | — |
|  | Borate*[2-7] | — | — | — | — |
|  | Quaternary ammonium ethyl sulphate*[2-8] | — | — | — | — |
| Photopolymerization initiator*[2-9] |  | 0.5 | 0.5 | 0.5 | 0.5 |
| Potential 0.4 seconds thereafter under HH environment (V) |  | 48 | 45 | 40 | 40 |
| Evaluation of printing fog under HH environment |  | ○ | ○ | ○ | ○ |
| Resistance value under LL environment (LogΩ) |  | 7.2 | 6.2 | 6 | 6 |
| Printed image quality under LL environment |  | ○ | ○ | ○ | ○ |

TABLE 14

|  |  | Comparative Example 2-3 | Example 2-8 | Comparative Example 2-4 | Example 2-9 |
|---|---|---|---|---|---|
| Elastic layer composition | Urethane acrylate oligomer*2-1 | 80 | 80 | 80 | 80 |
|  | Acrylic monomer*2-2 | 20 | 20 | 20 | 20 |
| Ionic conductive agent | Acrylic monomer solution of lithium imide*2-3 | — | — | — | — |
|  | Sodium perchlorate*2-4 | — | — | — | — |
|  | Quaternary ammonium perchlorate*2-5 | 0.1 | 0.5 | 2 | 1 |
|  | Quaternary ammonium alkyl sulfate*2-6 | — | — | — | — |
|  | Borate*2-7 | — | — | — | — |
|  | Quaternary ammonium ethyl sulphate*2-8 | — | — | — | — |
| Photopolymerization initiator*2-9 |  | 0.5 | 0.5 | 0.5 | 0.5 |
| Potential 0.4 seconds thereafter under HH environment (V) |  | 20 | 58 | 20 | 35 |
| Evaluation of printing fog under HH environment |  | ○ | ○ | x | ○ |
| Resistance value under LL environment (LogΩ) |  | 9.0 | 8.5 | 7.2 | 7.6 |
| Printed image quality under LL environment |  | x | x | ○ | Δ |

TABLE 15

|  |  | Example 2-10 | Example 2-11 | Comparative Example 2-5 | Example 2-12 |
|---|---|---|---|---|---|
| Elastic layer composition | Urethane acrylate oligomer*2-1 | 80 | 80 | 80 | 80 |
|  | Acrylic monomer*2-2 | 20 | 20 | 20 | 20 |
| Ionic conductive agent | Acrylic monomer solution of lithium imide*2-3 | — | — | — | — |
|  | Sodium perchlorate*2-4 | — | — | — | — |
|  | Quaternary ammonium perchlorate*2-5 | — | — | — | — |
|  | Quaternary ammonium alkyl sulfate*2-6 | 0.1 | 0.5 | 2 | 1 |
|  | Borate*2-7 | — | — | — | — |
|  | Quaternary ammonium ethyl sulphate*2-8 | — | — | — | — |
| Photopolymerization initiator*2-9 |  | 0.5 | 0.5 | 0.5 | 0.5 |
| Potential 0.4 seconds thereafter under HH environment (V) |  | 98 | 56 | 22 | 30 |
| Evaluation of printing fog under HH environment |  | ○ | ○ | x | ○ |
| Resistance value under LL environment (LogΩ) |  | 8.6 | 8.5 | 7.6 | 7.9 |
| Printed image quality under LL environment |  | x | x | ○ | Δ |

TABLE 16

|  |  | Example 2-13 | Example 2-14 | Comparative Example 2-6 | Example 2-15 |
|---|---|---|---|---|---|
| Elastic layer composition | Urethane acrylate oligomer*2-1 | 80 | 80 | 80 | 80 |
|  | Acrylic monomer*2-2 | 20 | 20 | 20 | 20 |
| Ionic conductive agent | Acrylic monomer solution of lithium imide*2-3 | — | — | — | — |
|  | Sodium perchlorate*2-4 | — | — | — | — |
|  | Quaternary ammonium perchlorate*2-5 | — | — | — | — |
|  | Quaternary ammonium alkyl sulfate*2-6 | — | — | — | — |
|  | Borate*2-7 | 0.1 | 0.5 | 2 | 1 |
|  | Quaternary ammonium ethyl sulphate*2-8 | — | — | — | — |
| Photopolymerization initiator*2-9 |  | 0.5 | 0.5 | 0.5 | 0.5 |
| Potential 0.4 seconds thereafter under HH environment (V) |  | 112 | 65 | 15 | 39 |
| Evaluation of printing fog under HH environment |  | ○ | ○ | x | ○ |
| Resistance value under LL environment (LogΩ) |  | 9.1 | 8.5 | 6.8 | 7.2 |
| Printed image quality under LL environment |  | x | x | ○ | ○ |

TABLE 17

|  |  | Example 2-16 | Example 2-17 | Example 2-18 |
|---|---|---|---|---|
| Elastic layer composition | Urethane acrylate oligomer *2-1 | 80 | 80 | 80 |
|  | Acrylic monomer *2-2 | 20 | 20 | 20 |
| Ionic conductive agent | Acrylic monomer solution of lithium imide *2-3 | — | — | — |
|  | Sodium perchlorate *2-4 | — | — | — |
|  | Quaternary ammonium perchlorate *2-5 | — | — | — |
|  | Quaternary ammonium alkyl sulfate *2-6 | — | — | — |
|  | Borate *2-7 | — | — | — |
|  | Quaternary ammonium ethyl sulphate *2-8 | 0.1 | 0.5 | 2 |
| Photopolymerization initiator *2-9 |  | 0.5 | 0.5 | 0.5 |
| Potential 0.4 seconds thereafter under HH environment (V) |  | 212 | 62 | 42 |
| Evaluation of printing fog under HH environment |  | ○ | ○ | ○ |
| Resistance value under LL environment (LogΩ) |  | 8.7 | 8.6 | 8 |
| Printed image quality under LL environment |  | x | x | x |

As shown in the above-mentioned Table, in Examples 2-1 to 2-3 in which the surface potential under HH environment was high and the resistance under LL environment was low, the occurrence of fogging under HH environment was not observed, and for the printed image quality under LL environment, a good result was obtained. On the other hand, in Comparative Example 2-1, since an ionic conductive agent was not added, the surface potential under HH environment was high, although the resistance under LL environment was too high, and thus the printed image quality was poor. In Comparative Example 2-2, since the amount of an ionic conductive agent added was too large, the surface potential under HH environment was too low, and thus fogging occurred. It was confirmed that sodium perchlorate used in Examples 2-4 to 2-7 was effective for maintaining the surface potential and that the resistance value can be adjusted in an appropriate range. Too high compounding ratio, however, causes harmful effects such as rust in piping.

In Examples 2-8, 2-9, although a sodium perchlorate salt of quaternary ammonium is used as an ionic conductive agent, since a sodium perchlorate salt of quaternary ammonium has a poor effect of reducing the resistance, the image quality under LL environment did not improve unless the amount thereof added was large to some extent. On the other hand, since a sodium perchlorate salt of quaternary ammonium has a high charge transport ability, fogging under HH environment occurred when the amount thereof added was in excess as in Comparative Example 2-4.

In Examples 2-10 to 2-12, although a quaternary ammonium diethyl sulphate is used as an ionic conductive agent, since the quaternary ammonium diethyl sulphate has a poor effect of reducing the resistance, the image quality under LL environment does not improve unless the amount thereof added is large to some extent. On the other hand, since the quaternary ammonium diethyl sulphate has a high charge transport ability, fogging under HH environment occurred when the amount thereof added was in excess as in Comparative Example 2-5.

In Examples 2-13 to 2-15, although borate was used as an ionic conductive agent, since borate has a poor effect of reducing the resistance, the image quality under LL environment did not improve unless the amount thereof added was large to some extent. On the other hand, since borate has a high charge transport ability, fogging under HH environment occurred when the amount thereof added was in excess as in Comparative Example 2-6.

In Examples 2-16 to 2-18, quaternary ammonium ethyl sulphate was used as an ionic conductive agent. In this case, although the occurrence of fogging was not observed, since quaternary ammonium ethyl sulphate has a poor effect of reducing the resistance, even when the amount thereof added was large, the image quality under LL environment was not improved.

As mentioned above, it was confirmed that, in the developing roller, by keeping the surface potential after electrification under HH environment high, the occurrence of fogging under HH environment can be prevented, and that by setting the resistance under LL environment to a predetermined low value, the printed image quality under LL environment was good.

Example 3

Materials for an elastic layer as listed in each of the Table below were kneaded at 60 rpm for one hour by a planetary mixer to prepare a composition for forming an elastic layer. The obtained composition for forming an elastic layer was applied to the outer periphery of a shaft (external diameter: 13 mm, material: aluminum) by traverse coating using a roll coater. While rotating the coated shaft, the coated shaft was irradiated with a UV light by using a electrodeless UV lamp, H bulb, manufactured by Heraeus Noblelight Fusion UV Inc. for five seconds to form an elastic layer having a thickness of 1.5 mm.

TABLE 18

|  | Manufacturer | Product name | parts by mass |
|---|---|---|---|
| Urethane acrylate oligomer | manufactured by Asia Industry Co., Ltd. | NX44-31 | 80 |
| Acrylic monomer | manufactured by kyoeisha Chemical Co., Ltd. | LIGHT ESTER HOA | 20 |
| Ionic conductive agent | manufactured by Sanko Chemical Industry Co., Ltd. | Sankonol MTGA-50R | 0.5 |
| Photo initiator | manufactured by BASF Japan Ltd. | IRGACURE 184 | 0.5 |

Next, in accordance with the intermediate layer formulation as listed in the Tables 20 to 27 below, a composition for forming an intermediate layer was prepared in the same manner as above. The obtained composition for forming an intermediate layer was applied to the outer periphery of the shaft on which the elastic layer was formed by traverse coating using a roll coater. While rotating the coated shaft, the coated shaft was irradiated with a UV light by using a electrodeless UV lamp, H bulb, manufactured by Heraeus Noblelight Fusion UV Inc. for five seconds to form an intermediate layer having a thickness of 3 μm.

Composition for forming a surface layer was prepared in accordance with the surface layer formulation listed on the Table below in the same manner as above. The obtained composition for forming a surface layer was applied to the outer periphery of a shaft on which an elastic layer and an intermediate layer were formed by traverse coating using a roll coater. While rotating the coated shaft, the coated shaft was irradiated with a UV light by using a electrodeless UV lamp, H bulb, manufactured by Heraeus Noblelight Fusion UV Inc. for five seconds to form a surface layer having a thickness of 2 μm, thereby obtaining individual developing rollers of Example and Comparative Example.

TABLE 19

| | Manufacturer | Product name | parts by mass |
|---|---|---|---|
| Urethane acrylate oligomer | manufactured by NIPPON SODA CO., LTD. | TEAI-1000 (obtained by reacting polybutadiene-based polyol, polyisocyanate and hydroxyl-containing acrylate) | 68 |
| Acrylic monomer | manufactured by kyoeisha Chemical Co., Ltd. | LIGHT ACRYLATE TMP-A | 12 |
| | manufactured by The Nippon Synthetic Chemical Industry Co., Ltd. | UV-AF201 | 10 |
| | manufactured by DIC Corporation | MEGAFACE RS-72K | 5 |
| | manufactured by UNIMATEC CO., LTD. | FAAC-6 | 10 |
| Urethane particle | manufactured by Dainichiseika Color & Chemicals Mfg. Co., Ltd. | DAIMICBEAZ 5050D | 30 |
| Photopolymerization initiator | manufactured by BASF Japan Ltd. | IRGACURE 184 | 1 |

<Resistance Values Under Under Low-Temperature and Low-Humidity (LL) Environment and Under High-Temperature and High-Humidity (HH) Environment>

For the obtained developing roller of each of Examples and Comparative Examples (Tables 20 to 22), the resistance values under conditions at a temperature of 10° C. and at a humidity of 15% RH and under conditions at a temperature of 32.5° C. and at a humidity of 80% RH(HH) were measured, and the difference therebetween was calculated.

<Evaluation of Printed Image Qualities Under Low-Temperature and Low-Humidity (LL) Environment and Under High-Temperature and High-Humidity (HH) Environment>

The obtained developing roller in each of Examples and Comparative Examples (Tables 20 to 22) was placed in a commercially available printer (manufactured by BROTHER INDUSTRIES, LTD.; HL-2240D) under a condition at a temperature of 10° C. and a humidity of 15% RH (LL) and under a condition at a temperature of 32.5° C. and a humidity of 80% RH(HH); 1000 sheets were printed in 1% density to be left to stand still overnight, and then 100% density black image was printed thereon. The transmission density thereof was measured to be set as a printed image quality. When the transmission density was 1.85 or lower, the result was represented by "x" (decrease in density); when the transmission density was higher than 1.85 and lower than 1.90, the result was represented by "Δ" and when the transmission density was higher than 1.90, the result was represented by "○". Measurement of the transmission density was performed by using X-Rite 310T manufactured by SAKATA INX ENG. CO., LTD.

The results of the above are listed on the Tables below in combination.

TABLE 20

| | | Comparative Example 3-1 | Example 3-1 | Example 3-2 | Example 3-3 | Example 3-4 | Comparative Example 3-2 |
|---|---|---|---|---|---|---|---|
| Intermediate layer composition | Urethane acrylate oligomer*[3-1] | 60 | 60 | 60 | 60 | 60 | 60 |
| | Acrylic monomer A*[3-2] | 13 | 13 | 13 | 13 | 13 | 13 |
| | Acrylic monomer B*[3-3] | 15 | 15 | 15 | 15 | 15 | 15 |
| | Acrylic monomer C*[3-4] | 8 | 8 | 8 | 8 | 8 | 8 |
| | Acrylic monomer D*[3-5] | 5 | 5 | 5 | 5 | 5 | 5 |
| | Carbon black A*[3-6] | 0.9 | 1.5 | 1.8 | 2.1 | 4.2 | — |
| | Carbon black B*[3-7] | — | — | — | — | — | 0.9 |
| | Ionic conductive agent A*[3-8] | — | — | — | — | — | — |
| | Ionic conductive agent B*[3-9] | — | — | — | — | — | — |
| | Photopolymerization initiator  IRGACURE 184*[3-10] | 1 | 1 | 1 | 1 | 1 | 1 |
| | IRGACURE 819*[3-11] | 1 | 1 | 1 | 1 | 1 | 1 |

TABLE 20-continued

|  |  | Comparative Example 3-1 | Example 3-1 | Example 3-2 | Example 3-3 | Example 3-4 | Comparative Example 3-2 |
|---|---|---|---|---|---|---|---|
| Resistance value (LogΩ) | LL environment | 8.2 | 7.5 | 5.8 | 4.9 | 4.4 | 8.4 |
|  | HH environment | 6.4 | 6.1 | 5.1 | 4.5 | 3.9 | 6.6 |
|  | Difference | 1.8 | 1.4 | 0.7 | 0.4 | 0.5 | 1.8 |
| Printing quality | LL environment | ○ | ○ | ○ | ○ | ○ | x |
|  | HH environment | ○ | ○ | ○ | ○ | ○ | ○ |

[3-1] Urethane acrylate oligomer: BT-01D (manufactured by Dai-ichi Kogyo Seiyaku Co., Ltd.)
[3-2] Acrylic monomer A: NK Ester AMO (manufactured by Shin-Nakamura Chemical Co., Ltd.)
[3-3] Acrylic monomer B: NK Ester A-SA (manufactured by Shin-Nakamura Chemical Co., Ltd.)
[3-4] Acrylic monomer C: LIGHT ACRYLATE 14EG-A (manufactured by kyoeisha Chemical Co., Ltd.)
[3-5] Acrylic monomer D: Karenz AOI (manufactured by Showa Denko K.K.)
[3-6] Carbon black A: ketjen black (manufactured by MIKUNI COLOR LTD. (trial material))
[3-7] Carbon black B: Denka Black (manufactured by DENKI KAGAKU KOGYO KABUSHIKI KAISHA)
[3-8] Ionic conductive agent A: Sankonol MTGA-50R (acrylic monomer solution of lithium imide, manufactured by Sanko Chemical Industry Co., Ltd.)
[3-9] Ionic conductive agent B: MP-100 (sodium perchlorate, manufactured by Showa Chemical Industry Co., Ltd.)
[3-10] IRGACURE 184: (absorption coefficient at 254 nm of $3.32 \times 10^4$ ml/g · cm, manufactured by BASF Japan Ltd.)
[3-11] IRGACURE 819: (absorption coefficient at 365 nm of $2.31 \times 10^3$ ml/g · cm, manufactured by BASF Japan Ltd.)

TABLE 21

|  |  | Example 3-5 | Example 3-6 | Example 3-7 | Example 3-8 | Comparative Example 3-3 | Comparative Example 3-4 |
|---|---|---|---|---|---|---|---|
| Intermediate layer composition | Urethane acrylate oligomer[3-1] | 60 | 60 | 60 | 60 | 60 | 60 |
|  | Acrylic monomer A[3-2] | 13 | 13 | 13 | 13 | 13 | 13 |
|  | Acrylic monomer B[3-3] | 15 | 15 | 15 | 15 | 15 | 15 |
|  | Acrylic monomer C[3-4] | 8 | 8 | 8 | 8 | 8 | 8 |
|  | Acrylic monomer D[3-5] | 5 | 5 | 5 | 5 | 5 | 5 |
|  | Carbon black A[3-6] | — | — | — | — | — | — |
|  | Carbon black B[3-7] | 1.5 | 1.8 | 2.1 | 4.2 | — | — |
|  | Ionic conductive agent A[3-8] | — | — | — | — | 0.1 | 0.5 |
|  | Ionic conductive agent B[3-9] | — | — | — | — | — | — |
|  | Photopolymerization initiator IRGACURE 184[3-10] | 1 | 1 | 1 | 1 | 1 | 1 |
|  | IRGACURE 819[3-11] | 1 | 1 | 1 | 1 | 1 | 1 |
| Resistance value (LogΩ) | LL environment | 7.7 | 7 | 5.1 | 4.6 | 8 | 7.9 |
|  | HH environment | 6.3 | 5.3 | 4.7 | 4.1 | 6.4 | 6.3 |
|  | Difference | 1.4 | 1.7 | 0.4 | 0.5 | 1.6 | 1.6 |
| Printing quality | LL environment | ○ | ○ | ○ | ○ | x | Δ |
|  | HH environment | ○ | ○ | ○ | ○ | ○ | ○ |

TABLE 22

|  |  | Comparative Example 3-5 | Comparative Example 3-6 | Comparative Example 3-7 | Comparative Example 3-8 |
|---|---|---|---|---|---|
| Intermediate layer composition | Urethane acrylate oligomer[3-1] | 60 | 60 | 60 | 60 |
|  | Acrylic monomer A[3-2] | 13 | 13 | 13 | 13 |
|  | Acrylic monomer B[3-3] | 15 | 15 | 15 | 15 |
|  | Acrylic monomer C[3-4] | 8 | 8 | 8 | 8 |
|  | Acrylic monomer D[3-5] | 5 | 5 | 5 | 5 |
|  | Carbon black A[3-6] | — | — | — | — |
|  | Carbon black B[3-7] | — | — | — | — |
|  | Ionic conductive agent A[3-8] | 1.5 | — | — | — |
|  | Ionic conductive agent B[3-9] | — | 0.1 | 0.5 | 1.5 |
|  | Photopolymerization initiator IRGACURE 184[3-10] | 1 | 1 | 1 | 1 |
|  | IRGACURE 819[3-11] | 1 | 1 | 1 | 1 |

TABLE 22-continued

|  |  | Comparative Example 3-5 | Comparative Example 3-6 | Comparative Example 3-7 | Comparative Example 3-8 |
|---|---|---|---|---|---|
| Resistance value (LogΩ) | LL environment | 7.9 | 8.2 | 8.1 | 8.1 |
|  | HH environment | 6.3 | 6.3 | 6.3 | 6.3 |
|  | Difference | 1.6 | 1.9 | 1.8 | 1.8 |
| Printing quality | LL environment | Δ | x | x | x |
|  | HH environment | ○ | ○ | ○ | ○ |

<Evaluation of Hardened Film>

For the obtained developing roller in each of Examples and Comparative Examples (Tables 23 to 27), the curing state of the film was evaluated by a direct contact. When the film was not changed even when it was touched by a finger, the result was judged as "good"; when peeling occurred when the film was touched by a finger, the result was judged as "poor". 2 mm-square 5×5 cuts were made on the surface of each developing roller, and Cloth Adhesive Tape (Sekisui-Cloth Light Tape) was attached thereto and removed therefrom, which were repeated for ten times. The number of grids which was remained thereon unremoved was set to X, and evaluated as X/25. The results thereof are listed in combination on the Table below.

TABLE 23

|  |  |  | Comparative Example 3-1 | Example 3-1 | Example 3-2 | Example 3-3 | Example 3-4 |
|---|---|---|---|---|---|---|---|
| Intermediate layer composition | Urethane acrylate oligomer*[3-1] |  | 60 | 60 | 60 | 60 | 60 |
|  | Acrylic monomer A*[3-2] |  | 13 | 13 | 13 | 13 | 13 |
|  | Acrylic monomer B*[3-3] |  | 15 | 15 | 15 | 15 | 15 |
|  | Acrylic monomer C*[3-4] |  | 8 | 8 | 8 | 8 | 8 |
|  | Acrylic monomer D*[3-5] |  | 5 | 5 | 5 | 5 | 5 |
|  | Carbon black A*[3-6] |  | 0.9 | 1.5 | 1.8 | 2.1 | 4.2 |
|  | Photopolymerization initiator | IRGACURE 184*[3-10] | 1 | 1 | 1 | 1 | 1 |
|  |  | IRGACURE 819*[3-11] | 1 | 1 | 1 | 1 | 1 |
| Evaluation of hardened film | Status |  | good | good | good | good | good |
|  | Cross cut test |  | 25/25 | 25/25 | 25/25 | 25/25 | 25/25 |

TABLE 24

|  |  |  | Comparative Example 3-9 | Comparative Example 3-10 | Comparative Example 3-11 | Comparative Example 3-12 | Comparative Example 3-13 | Comparative Example 3-14 |
|---|---|---|---|---|---|---|---|---|
| Intermediate layer composition | Urethane acrylate oligomer*[3-1] |  | 60 | 60 | 60 | 60 | 60 | 60 |
|  | Acrylic monomer A*[3-2] |  | 13 | 13 | 13 | 13 | 13 | 13 |
|  | Acrylic monomer B*[3-3] |  | 15 | 15 | 15 | 15 | 15 | 15 |
|  | Acrylic monomer C*[3-4] |  | 8 | 8 | 8 | 8 | 8 | 8 |
|  | Acrylic monomer D*[3-5] |  | 5 | 5 | 5 | 5 | 5 | 5 |
|  | Carbon black A*[3-6] |  | 0.9 | 1.5 | 1.8 | 0.9 | 1.5 | 1.8 |
|  | Photopolymerization initiator | IRGACURE 184*[3-10] | 1 | 1 | 1 | — | — | — |
|  |  | IRGACURE 819*[3-11] | — | — | — | 1 | 1 | 1 |
| Evaluation of hardened film | Status |  | good | poor | poor | good | good | good |
|  | Cross cut test |  | 25/25 | 12/25 | 0/25 | 25/25 | 25/25 | 15/25 |

TABLE 25

|  |  | Comparative Example 3-15 | Comparative Example 3-16 | Comparative Example 3-17 | Comparative Example 3-18 | Comparative Example 3-19 |
|---|---|---|---|---|---|---|
| Intermediate layer composition | Urethane acrylate oligomer*[3-1] | 60 | 60 | 60 | 60 | 60 |
|  | Acrylic monomer A*[3-2] | 13 | 13 | 13 | 13 | 13 |
|  | Acrylic monomer B*[3-3] | 15 | 15 | 15 | 15 | 15 |
|  | Acrylic monomer C*[3-4] | 8 | 8 | 8 | 8 | 8 |
|  | Acrylic monomer D*[3-5] | 5 | 5 | 5 | 5 | 5 |
|  | Carbon black A*[3-6] | 4.2 | 4.2 | 4.2 | 4.2 | 4.2 |

TABLE 25-continued

|  |  | Comparative Example 3-15 | Comparative Example 3-16 | Comparative Example 3-17 | Comparative Example 3-18 | Comparative Example 3-19 |
|---|---|---|---|---|---|---|
| Photopolymerization initiator | IRGACURE 184*3-10 | — | — | — | — | 2 |
|  | IRGACURE 127*3-12 | 1 | — | — | — | — |
|  | IRGACURE 2959*3-13 | — | 1 | — | — | — |
|  | IRGACURE 819*3-11 | — | — | — | — | — |
|  | IRGACURE 369*3-14 | — | — | 1 | — | — |
|  | IRGACURE 907*3-15 | — | — | — | 1 | — |
| Evaluation of hardened film | Status | poor | poor | poor | poor | poor |
|  | Cross cut test | 0/25 | 0/25 | 12/25 | 12/25 | 0/25 |

*3-12 IRGACURE 127: (absorption coefficient at 254 nm of 7.34 × 10$^4$ ml/g · cm, manufactured by BASF Japan Ltd.)
*3-13 IRGACURE 2959: (absorption coefficient at 254 nm of 3.03 × 10$^4$ ml/g · cm, manufactured by BASF Japan Ltd.)
*3-14 IRGACURE 369: (absorption coefficient at 365 nm of 7.86 × 10$^3$ ml/g · cm, manufactured by BASF Japan Ltd.)
*3-15 IRGACURE 907: (absorption coefficient at 365 nm of 4.67 × 10$^2$ ml/g · cm, manufactured by BASF Japan Ltd.)

TABLE 26

|  |  | Comparative Example 3-20 | Comparative Example 3-21 | Comparative Example 3-22 | Comparative Example 3-23 | Comparative Example 3-24 |
|---|---|---|---|---|---|---|
| Intermediate layer composition | Urethane acrylate oligomer*3-1 | 60 | 60 | 60 | 60 | 60 |
|  | Acrylic monomer A*3-2 | 13 | 13 | 13 | 13 | 13 |
|  | Acrylic monomer B*3-3 | 15 | 15 | 15 | 15 | 15 |
|  | Acrylic monomer C*3-4 | 8 | 8 | 8 | 8 | 8 |
|  | Acrylic monomer ID*3-5 | 5 | 5 | 5 | 5 | 5 |
|  | Carbon black A*3-6 | 4.2 | 4.2 | 4.2 | 4.2 | 4.2 |
| Photopolymerization initiator | IRGACURE 184*3-10 | — | — | — | — | — |
|  | IRGACURE 127*3-12 | 2 | — | — | — | — |
|  | IRGACURE 2959*3-13 | — | 2 | — | — | — |
|  | IRGACURE 819*3-11 | — | — | 2 | — | — |
|  | IRGACURE 369*3-14 | — | — | — | 2 | — |
|  | IRGACURE 907*3-15 | — | — | — | — | 2 |
| Evaluation of hardened film | Status | poor | poor | good | good | good |
|  | Cross cut test | 0/25 | 0/25 | 16/25 | 12/25 | 14/25 |

TABLE 27

|  |  | Example 3-9 | Example 3-10 | Example 3-11 | Example 3-12 | Example 3-13 |
|---|---|---|---|---|---|---|
| Intermediate layer composition | Urethane acrylate oligomer*3-1 | 60 | 60 | 60 | 60 | 60 |
|  | Acrylic monomer A*3-2 | 13 | 13 | 13 | 13 | 13 |
|  | Acrylic monomer B*3-3 | 15 | 15 | 15 | 15 | 15 |
|  | Acrylic monomer C*3-4 | 8 | 8 | 8 | 8 | 8 |
|  | Acrylic monomer D*3-5 | 5 | 5 | 5 | 5 | 5 |
|  | Carbon black A*3-6 | 4.2 | 4.2 | 4.2 | 4.2 | 4.2 |
| Photopolymerization initiator | IRGACURE 184*3-10 | 1 | 1 | — | — | — |
|  | IRGACURE 127*3-12 | — | — | 1 | 1 | 1 |
|  | IRGACURE 2959*3-13 | — | — | — | — | — |
|  | IRGACURE 819*3-11 | — | — | 1 | — | — |
|  | IRGACURE 369*3-14 | 1 | — | — | 1 | — |
|  | IRGACURE 907*3-15 | — | 1 | — | — | 1 |

TABLE 27-continued

|  |  | Example 3-9 | Example 3-10 | Example 3-11 | Example 3-12 | Example 3-13 |
|---|---|---|---|---|---|---|
| Evaluation of hardened film | Status | good | good | good | good | good |
|  | Cross cut test | 25/25 | 25/25 | 25/25 | 25/25 | 15/25 |

As shown in the above Tables, in a developing roller of each of Examples in which to an intermediate layer, a UV curable resin and more than a predetermined amount of carbon black are added, and further, specific two kinds of photopolymerization initiators were added, change in resistance value due to environmental variation was small, and a good printing quality was obtained under both of a condition of low-temperature and low-humidity and a condition of high-temperature and high-humidity. In such a developing roller of Example, it was confirmed that a problem of coating film peeling due to poor curing of the intermediate layer did not occur.

DESCRIPTION OF SYMBOLS

1 Shaft
2 Elastic layer
3 Intermediate layer
4 Surface layer
10 Developing roller
11 Toner supplying roller
12 Photoconductor drum
13 Toner
14 Layer forming blade
15 Transfer unit
16 Cleaning unit
17 Cleaning blade
21 Corona discharger
22 Surface potentiometer probe

The invention claimed is:

1. A developing roller comprising successively on an outer periphery of a shaft an elastic layer, an intermediate layer, and a surface layer wherein
said surface layer contains a urethane (meth)acrylate oligomer obtained by allowing a polybutadiene polyol or a hydrogenated polybutadiene polyol, a polyisocyanate, and a (meth)acrylate having a hydroxyl group to react, and said intermediate layer contains 1 part by mass or more of carbon black with respect to 100 parts by mass of an ultraviolet curable resin, and wherein when a surface of said elastic layer is electrified by corona discharge at 8 kV from a position 1 mm away from the surface under conditions at a temperature of 32.5° C. and at a humidity of 80% RH, a surface potential 0.4 seconds thereafter is 25 V or higher.

2. The developing roller according to claim 1, wherein said elastic layer contains an ultraviolet curable resin and an ionic conductive agent.

3. The developing roller according to claim 1, wherein a resistance value of the developing roller under conditions at a temperature of 10° C. and at a humidity of 15% RH is $10^4$ to $10^8 \Omega$.

4. The developing roller according to claim 1, wherein said intermediate layer further contains a photopolymerization initiator having an absorption coefficient at 254 nm of $2 \times 10^4$ ml/g·cm or higher and a photopolymerization initiator having an absorption coefficient at 365 nm of $4 \times 10^2$ ml/g·cm or higher.

5. A developing roller including an elastic roller comprising on an outer periphery of a shaft at least an elastic layer, wherein said elastic layer contains an ultraviolet curable resin and an ionic conductive agent, and when the surface thereof is electrified by corona discharge at 8 kV from a position 1 mm away from the surface under conditions at a temperature of 32.5° C. and at a humidity of 80% RH, a surface potential 0.4 seconds thereafter is 25 V or higher, and
wherein an intermediate layer and a surface layer are laminated on said elastic layer, wherein the surface layer contains a urethane (meth)acrylate oligomer obtained by allowing a polybutadiene polyol or a hydrogenated polybutadiene polyol, a polyisocyanate, and a (meth) acrylate having a hydroxyl group to react.

6. The developing roller according to claim 5, wherein a resistance value of the developing roller under conditions at a temperature of 10° C. and at a humidity of 15% RH is $10^4$ to $10^8 \Omega$.

7. The developing roller according to claim 5, wherein an intermediate layer and a surface layer are laminated on said elastic layer, wherein the intermediate layer contains 1 part by mass or more of carbon black with respect to 100 parts by mass of an ultraviolet curable resin, and further contains a photopolymerization initiator having an absorption coefficient at 254 nm of $2 \times 10^4$ ml/g·cm or higher and a photopolymerization initiator having an absorption coefficient at 365 nm of $4 \times 10^2$ ml/g·cm or higher.

8. A developing roller comprising successively on an outer periphery of a shaft an elastic layer, an intermediate layer and a surface layer,
wherein said intermediate layer contains 1 part by mass or more of carbon black with respect to 100 parts by mass of an ultraviolet curable resin, and further contains a photopolymerization initiator having an absorption coefficient at 254 nm of $2 \times 10^4$ ml/g·cm or higher and a photopolymerization initiator having an absorption coefficient at 365 nm of $4 \times 10^2$ ml/g·cm or higher,
wherein said surface layer contains a urethane (meth)acrylate oligomer obtained by allowing a polybutadiene polyol or a hydrogenated polybutadiene polyol, a polyisocyanate, and a (meth)acrylate having a hydroxyl group to react, and wherein when a surface of said elastic layer is electrified by corona discharge at 8 kV from a position 1 mm away from the surface under conditions at a temperature of 32.5° C. and at a humidity of 80% RH, a surface potential 0.4 seconds thereafter is 25 V or higher.

9. The developing roller according to claim 8, wherein said elastic layer contains an ultraviolet curable resin and an ionic conductive agent.

10. The developing roller according to claim 8, wherein a resistance value of the developing roller under conditions at a temperature of 10° C. and at a humidity of 15% RH is $10^4$ to $10^8 \Omega$.

* * * * *